US006987955B1

(12) United States Patent
Sapozhnykov et al.

(10) Patent No.: US 6,987,955 B1
(45) Date of Patent: Jan. 17, 2006

(54) APPROACH FOR MANAGING POWER FOR COMMUNICATIONS CHANNELS BASED ON PERFORMANCE

(75) Inventors: Vitaliy Sapozhnykov, Melbourne (AU); Hongbing Gan, Carlton (AU); Bijan Treister, Kew (AU); Efstratios Skafidas, Coburg (AU); Yong Xiang, North Melbourne (AU)

(73) Assignee: Bandspeed, Inc., Austin, TX (US)

( * ) Notice: Subject to any disclaimer, the term of this patent is extended or adjusted under 35 U.S.C. 154(b) by 511 days.

(21) Appl. No.: 10/133,071

(22) Filed: Apr. 26, 2002

Related U.S. Application Data

(60) Provisional application No. 60/287,065, filed on Apr. 27, 2001.

(51) Int. Cl.
*H04B 1/04* (2006.01)

(52) U.S. Cl. .............................. 455/127.5; 455/127.1; 370/206; 375/133

(58) Field of Classification Search ............ 455/456.1, 455/403, 522, 127, 127.1, 127.5; 370/206, 370/318, 334, 338; 375/133
See application file for complete search history.

(56) References Cited

U.S. PATENT DOCUMENTS

| | | | | |
|---|---|---|---|---|
| 3,732,496 A | | 5/1973 | Boyer | 325/62 |
| 3,925,782 A | | 12/1975 | Anderl et al. | 343/178 |
| 5,465,399 A | | 11/1995 | Oberholtzer et al. | 455/69 |
| 6,169,907 B1 | | 1/2001 | Chang et al. | 455/522 |
| 6,314,135 B1 | * | 11/2001 | Schneider et al. | 375/232 |
| 6,590,873 B1 | * | 7/2003 | Li et al. | 370/318 |
| 2002/0136268 A1 | * | 9/2002 | Gan et al. | 375/133 |
| 2003/0058923 A1 | * | 3/2003 | Chen et al. | 375/133 |
| 2004/0042387 A1 | * | 3/2004 | Geile | 370/206 |
| 2004/0095907 A1 | * | 5/2004 | Agee et al. | 370/334 |
| 2005/0003831 A1 | * | 1/2005 | Anderson | 455/456.1 |
| 2005/0036467 A1 | * | 2/2005 | Kubler et al. | 370/338 |

* cited by examiner

*Primary Examiner*—Sonny Trinh
*Assistant Examiner*—Phuoc Doan
(74) *Attorney, Agent, or Firm*—Hickman Palermo Truong & Becker, LLP

(57) ABSTRACT

A novel approach for managing power for a plurality of communications channels based on communications channel performance is disclosed. According to one aspect of the invention, a first power and a second power that is different than the first power are determined based on performance data for the plurality of communications channels. The first power is used for communications that use a first communications channel, and the second power is used for communications that use a second communications channel. According to another aspect of the invention, a noise power is generated based on an error output of an equalizer that receives input from a communications channel, and a signal power is generated based on a signal output of the equalizer. A signal to noise ratio is determined based on the noise power and the signal power.

65 Claims, 13 Drawing Sheets

POWER REQUEST TABLE 500

| | | | | | | | |
|---|---|---|---|---|---|---|---|
| 510 CHANNEL NUMBER | 0 | 1 | 2 | 3 | ••• | 77 | 78 |
| 520 MASTER PARTICIPANT P4 | -4 | 1 | 3 | 0 | ••• | -2 | 3 |

FIG. 5A

TRANSMIT POWER TABLE 550

| | | | | | | | |
|---|---|---|---|---|---|---|---|
| 560 CHANNEL NUMBER | 0 | 1 | 2 | 3 | ••• | 77 | 78 |
| 570 SLAVE PARTICIPANT P3 | 5 | 6 | 6 | 4 | ••• | 2 | 0 |

FIG. 5B

TRANSMIT POWER TABLE 550

| | | | | | | | |
|---|---|---|---|---|---|---|---|
| 560 CHANNEL NUMBER | 0 | 1 | 2 | 3 | ••• | 77 | 78 |
| 570 SLAVE PARTICIPANT P3 | 1 | 7 | 9 | 4 | ••• | 0 | 3 |

FIG. 5C

MASTER POWER REQUEST TABLE 800

| | | | | | | | | |
|---|---|---|---|---|---|---|---|---|
| 810 | CHANNEL NUMBER | 0 | 1 | 2 | 3 | ••• | 77 | 78 |
| 820 | SLAVE PARTICIPANT P1 | -1 | 1 | -2 | -3 | ••• | -2 | 1 |
| 822 | SLAVE PARTICIPANT P2 | -3 | -2 | 0 | 2 | ••• | 4 | 2 |
| 824 | SLAVE PARTICIPANT P3 | 1 | -2 | 4 | 3 | ••• | 5 | 0 |
| 826 | SLAVE PARTICIPANT P5 | 0 | -3 | 1 | 2 | ••• | 2 | -1 |

FIG. 8A

SLAVE POWER REQUEST TABLE 850

| | | | | | | | | |
|---|---|---|---|---|---|---|---|---|
| 860 | CHANNEL NUMBER | 0 | 1 | 2 | 3 | ••• | 77 | 78 |
| 870 | MASTER PARTICIPANT P4 | 4 | 1 | 3 | 0 | ••• | -2 | 3 |

FIG. 8B

MASTER TRANSMIT POWER TABLE 900

| | | 0 | 1 | 2 | 3 | ... | 77 | 78 |
|---|---|---|---|---|---|---|---|---|
| 910 | CHANNEL NUMBER | 0 | 1 | 2 | 3 | ••• | 77 | 78 |
| 920 | SLAVE PARTICIPANT P1 | 1 | 4 | 7 | 3 | ••• | 0 | 3 |
| 922 | SLAVE PARTICIPANT P2 | 3 | 8 | 6 | 10 | ••• | 5 | 1 |
| 924 | SLAVE PARTICIPANT P3 | 5 | 6 | 6 | 4 | ••• | 2 | 0 |
| 926 | SLAVE PARTICIPANT P5 | 2 | 1 | 9 | 10 | ••• | 7 | 4 |

FIG. 9A

SLAVE TRANSMIT POWER TABLE 950

| | | | | | | | | |
|---|---|---|---|---|---|---|---|---|
| 960 | CHANNEL NUMBER | 0 | 1 | 2 | 3 | ••• | 77 | 78 |
| 970 | MASTER PARTICIPANT P4 | 0 | 8 | 7 | 0 | ••• | 1 | 9 |

FIG. 9B

APPROACH FOR MANAGING POWER FOR COMMUNICATIONS CHANNELS BASED ON PERFORMANCE

RELATED APPLICATION

This application claims domestic priority from prior U.S. provisional application Ser. No. 60/287,065, entitled "A METHOD FOR ADAPTIVE POWER CONTROL AND INTERFERENCE MINIMIZATION FOR WIRELESS COMMUNICATION NETWORKS," filed Apr. 27, 2001, naming as inventors VITALIY SAPOZHNYKOV, EFSTRATIOS SKAFIDAS, HONGBING GAN, YONG XIANG, and BIJAN TREISTER, the entire disclosure of which is hereby incorporated by reference for all purposes as if fully set forth herein.

FIELD OF THE INVENTION

The present invention generally relates to communications systems, and more specifically, to an approach for managing power for communications channels based on performance.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

A communications arrangement is any network, system, or mechanism that provides for the exchange of information or data between participants. As used herein, the terms communications network, communications system, and communications mechanism are used as examples of communications arrangements. As used herein, the term "participant" refers to any device or mechanism that exchanges data with other devices or mechanisms over a communications medium.

In some communications arrangements, one of the participants is designated as a "master participant." As used herein, the terms "master participant" and "master" are synonymous. The master participant performs one or more functions that are assigned to only the master participant and not to other participants. For example, a master participant may initiate and manage communications with other participants. As another example, the master participant may select a particular frequency-hopping scheme to be used in the communications network.

In communications arrangements with a master participant, the other participants are conventionally referred to as "slave participants." As used herein, the terms "slave participant" and "slave" are synonymous. Communications arrangements that use a master participant conventionally use only a single master participant, with any number of slave participants. In some communications arrangements, master participants are elected from available slave participants according to a selection or voting algorithm. In other communications arrangements, master participants are the participants that initiate connections with other participants.

A frequency hopping (FH) protocol is an example of a multiple communications channel approach for wireless communications in a communications network that uses a frequency hopping signal transmission technique in which information or data is transmitted over a set of frequencies in a communications frequency band. A frequency hopping communications system is a system that uses an FH protocol. The order in which the communications network hops among the set of frequencies is known as the hopping sequence. In contrast to FH systems, a non-frequency hopping (NFH) system is simply a communications system whose carrier does not hop over a set of frequencies. A typical NFH system may occupy a portion of the communications frequency band corresponding to several frequencies used by an FH system.

With some communications system approaches, such as the FH approach, the frequency band is broken up into separate frequencies, often referred to as "communications channels." As used herein, the terms "communication channel" and "channel" are synonymous. For example, an FH system transmits data on one channel, hops to another channel in the hopping sequence to transmit more data, and continues by transmitting data on subsequent channels in the hopping sequence. The switching of frequencies may occur many times each second.

An example of a frequency hopping protocol is the Institute of Electrical and Electronics Engineers (IEEE) 802.15.1 Wireless Personal Area Network Standard, which is based on the Bluetooth™ wireless personal area network (WPAN) technology from the Bluetooth Special Interest Group (SIG). The BLUETOOTH trademarks are owned by Bluetooth SIG, Inc., U.S.A. The Bluetooth protocol uses 79 individual randomly chosen frequency channels numbered from 0 to 78 and changes the frequencies 1600 times per second. Examples of NFH systems include the IEEE 802.11b Wireless Local Area Network (WLAN) in non-frequency hopping mode, which is the mode that typically is used, and the IEEE 802.15.3 next-generation WPAN, both of which operate in the 2.4 GHz Industrial, Scientific, Medical (ISM) band, which is an unlicensed portion of the radio spectrum that may be used in most countries by anyone without a license.

Typically, the master of an FH communications system transmits at even-numbered timeslots on the hopping sequence and the slaves listen at those regular intervals. The master will address one slave (or all slaves in a "broadcast" mode), and the addressed slave responds back to the master at the next odd-numbered timeslot. A preamble, which is known to all the participants of the FH network, is used to identify the network and for the slaves to synchronize with the master. For example, in Bluetooth and IEEE 802.15.1, the known preamble is called the "channel access code."

A common problem for communications systems is poor transmission quality of communications channels, also referred to as poor channel performance, which results in data transmission errors. For example, poor channel performance may increase the bit error rate (BER), which results in the loss of packets, leading to reduced transmission quality and reduced throughput (e.g., the amount of information successfully transmitted and received). As used herein, a "data packet" is a block of data used for transmissions in a packet-switched system, and the terms "data packet" and "packet" are synonymous.

A common source of poor channel performance is interference from other communications systems or other interference sources. Interference has a dynamic nature due to the use of different devices at different times and locations, and as a result, eventually all channels of a communication system that uses multiple channels may experience some degree of interference at some time. Interference is largely dependent on the type of device and the device's operating characteristics. For example, cordless phones and wireless LAN's occupy different channels. Moreover WLAN may occupy one of three different subsets of channels depending on quality of service requirements. Interference may change depending on the several factors including, but not limited to, the following: the type of device, such as cordless phone or WLAN; the operation mode of the device, which determines the particular channels that are occupied; when the communications systems use the band; and the relative locations of the participants of each system to participants of other systems. Because the participants may be mobile, interference may vary depending on the movements of the participants of one system relative to the locations of participants of other systems. In addition, interference may arise from other sources resulting in a degradation of performance.

One strategy for managing poor channel performance is to increase the power used in the transmissions such that interference has less of an impact because the system is transmitting at the increased power. However, in mobile applications, this increased power approach drains batteries used by the participants, reduces the standby time of the participants, and increases recharge times. Thus, the required power increase may be impractical due to such adverse impacts. While the size of the batteries can be increased, minimizing battery size and the cost of the batteries is of concern for most mobile and wireless devices. Also, the increased power approach only benefits the system using the increased power and results in a larger interference impact on other systems. Moreover, if the other devices employ power control, the increased power approach would lead all the devices eventually to transmit using the maximum transmit power.

Other strategies for managing poor channel performance include retransmitting data that had errors and incorporating a form of redundancy into the transmission (e.g., by including multiple copies of some or all of the data) so that the participant receiving the data can identify and correct transmission errors. However, such approaches require additional resources to both identify the errors and then to correct the errors, such as by using additional transmissions or by using redundant data transmission approaches that decrease the amount of information that can be transmitted, which reduces the throughput of the communications system.

Another strategy for addressing the issues of interference, power consumption, and decreased system throughput is to employ a power control approach that changes the power on which transmissions are made (e.g., the "transmit power") based on system performance. For example, when performance is poor, the transmit power may be increased to achieve improved performance. Similarly, when performance is good, the transmit power may be decreased to conserve power while maintaining performance at acceptable levels.

One power control strategy adjusts the transmit power for the communications arrangement based on the performance of the communications channels used by the communications system. The change in the communication system's transmit power may be determined by a number of approaches. For example, one approach is to ensure adequate performance on all communications channels using the performance of the worst communications channel to set the transmit power (e.g., a so-called "lowest common denominator" approach). However, the increased transmit power for the communications arrangement is not needed for channels that do not require the extra power for suitable performance, resulting in increased power consumption.

Another approach for determining the transmit power of a communications system is to select the transmit power for the communications arrangement so that at least a specified number of channels have acceptable performance. This can minimize power consumption on communications channels that do not need an increase in transmit power for adequate performance. However, other communications channels will generally have unacceptable performance, thereby reducing the throughput of the communications system because such communications channels often fail to provide for successful communications. Furthermore, due to the dynamic nature of interference on multiple communication channel systems, it may be difficult to ensure that a suitable number of communications channels have acceptable performance while trying to minimize power consumption.

Another power control approach uses received signal strength indicator (RSSI) to measure performance. For example, the RSSI of a communication is measured and compared to a specified RSSI value. If the measured RSSI is greater than the specified RSSI value, the transmit power is reduced to conserve power. Conversely, if the measured RSSI is less than the specified RSSI value, the transmit power is increased to provide adequate performance, albeit at the expense of increased power consumption.

However, a difficulty with the RSSI approach is that while the RSSI may be high due to a strong signal of interest, the RSSI also may be high due to a strong interference signal, such as another device located close by the participant receiving the communication. Therefore, in circumstances with high RSSI from a strong interference source, the transmit power may be reduced to conserve battery resources, resulting in decreased performance because of the bigger impact of the interference source on the subsequent reduced power communications.

Based on the need for wireless communications and the limitations in the conventional approaches, an approach for managing power for communications channels that does not suffer from the limitations of the prior approaches is highly desirable.

SUMMARY OF THE INVENTION

According to one aspect of the invention, a method is provided for managing power for a plurality of communications channels based on communications channel performance. The method includes determining, based on performance data for the plurality of communications channels, a first power for communications that use a first communications channel of the plurality of communications channels. The method also includes determining, based on the performance data, a second power for communications that use a second communications channel of the plurality of communications channels. The first power is different than the second power. According to another aspect of the invention, the first power, the second power, or both may be modified based on additional performance data.

According to another aspect of the invention, a method is provided for determining signal to noise ratios of communications channels based on equalizer outputs. The method includes generating a noise power, based on an error output of an equalizer that receives input from a communications channel. The method also includes generating a signal power, based on a signal output of the equalizer. The method further includes determining a signal to noise ratio based on the noise power and the signal power. According to another aspect of the invention, the noise power and signal power are determined by averaging two or more output samples from the equalizer.

According to other aspects, the invention encompasses a computer-readable medium, a carrier wave, an apparatus, and a system configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which:

FIG. 5A is a block diagram that depicts a power request table for a participant, according to an embodiment of the invention;

FIG. 5B is a block diagram that depicts a transmit power table for a participant, according to an embodiment of the invention;

FIG. 5C is a block diagram that depicts the transmit power table of FIG. 5B for a participant after being updated with the power request information of the power request table of FIG. 5A, according to an embodiment of the invention;

FIG. 8A is a block diagram that depicts a master power request table, according to an embodiment of the invention;

FIG. 8B is a block diagram that depicts a slave power request table, according to an embodiment of the invention;

FIG. 9A is a block diagram that depicts a master transmit power table, according to an embodiment of the invention;

FIG. 9B is a block diagram that depicts a slave transmit power table, according to an embodiment of the invention;

DETAILED DESCRIPTION OF THE INVENTION

Figure 1:
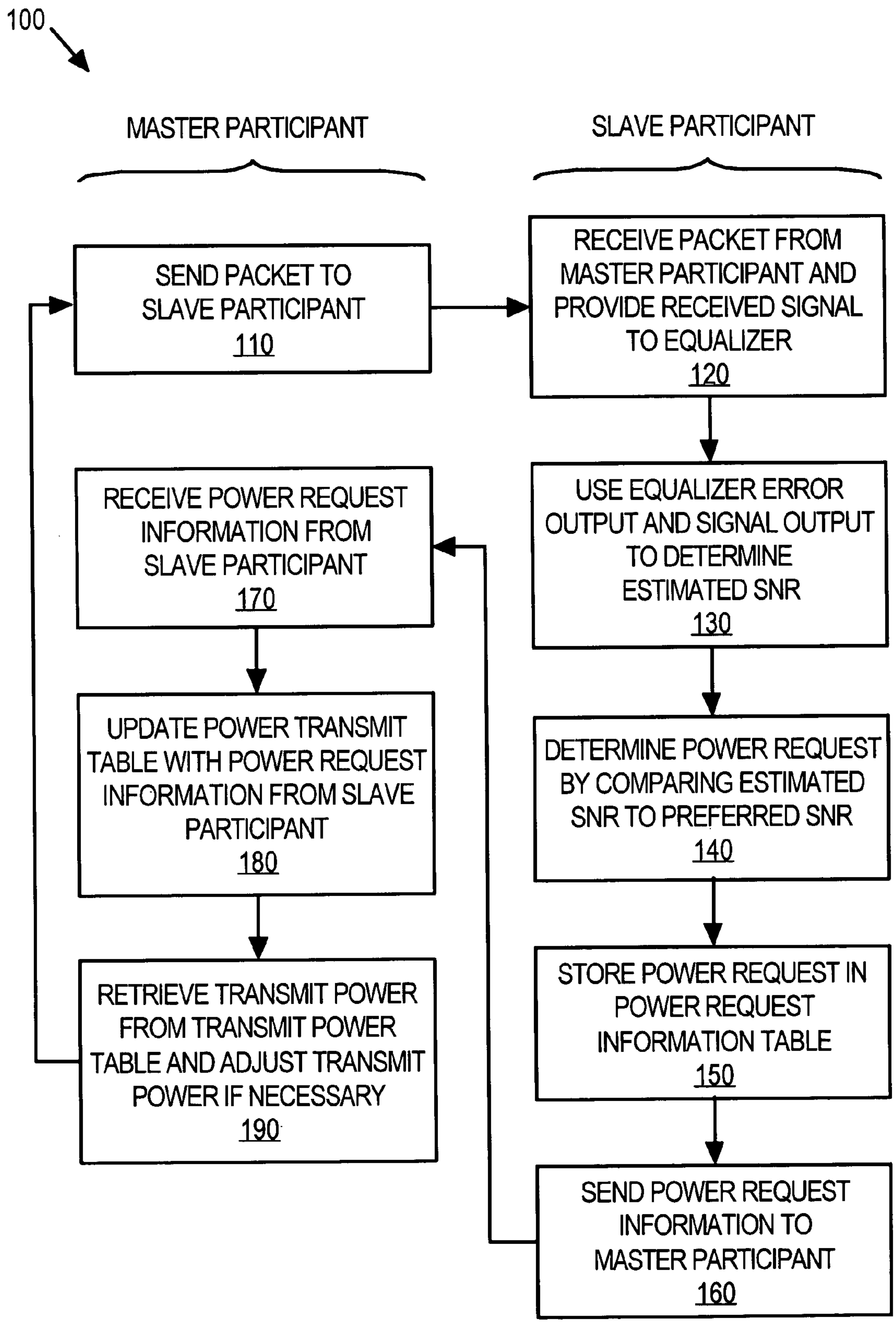
FIG. 1 is a logical block diagram that depicts a high level overview of an approach for managing power for communications channels based on performance, according to an embodiment of the invention.

An approach for managing power for communications channels based on performance is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. OVERVIEW
- A. Introduction
- B. Example Communications Arrangement
- C. Example Communications Mechanism
- D. Example Communications Device
- E. Determining Channel Performance
- F. Determining Power Requests
- G. Power Request Tables and Transmit Power Tables
- H. Determining Transmit Power II. DETERMINING COMMUNICATIONS CHANNEL PERFORMANCE USING EQUALIZER OUTPUTS
- A. Types of Equalizer Implementations
- B. Equalizer Operation—Training Period and Decision Directed Mode
- C. Determining Noise Powers and Signal Powers Based on Equalizer Outputs
- D. Generating Estimated Signal to Noise Ratios (SNRs) Based on Noise Powers and Signal Powers
- E. Other Performance Measurement Approaches III. POWER REQUESTS
- A. Specified SNR
- B. Determining a Power Request by Comparing Estimated SNR to Specified SNR
- C. Power Request Tables IV. TRANSMIT POWER TABLES
- A. Transmit Power Tables
- B. Transferring Power Request Table Information
- C. Power Request Information Packet
- D. Updating Transmit Power Tables with Power Request Information V. DETERMINING THE TRANSMIT POWER
- A. Selecting the Transmit Power Table Value as the Transmit Power
- B. Selecting a Higher Power Value as the Transmit Power
- C. Selecting a Lower Power Value as the Transmit Power
- D. Selecting a Nominal Transmit Power
- E. Modifying Transmit Power Tables

VI. IMPLEMENTATION MECHANISMS

VII. EXTENSIONS AND ALTERNATIVES

I. OVERVIEW

A. Introduction

A novel approach for managing power for communications channels generally involves determining different transmit powers for different communications channels between participants in the same communications arrangement. Instead of setting a single transmit power for use by the participants for the communications channels of the communications arrangement, the performance of the different communications channels between participants is used to set different transmit powers for the communications channels. Performance is monitored during operation of the communications arrangement and the transmit powers for the communications channels are adjusted to ensure continuing acceptable performance. Transmit powers may be selected based on several criteria that depend on the requirements of a particular application, such as ensuring that at least a minimum transmit power is used, ensuring that a maximum transmit power is not exceeded, and reducing power on channels for which the maximum transmit power fails to provide acceptable performance.

A novel approach for determining signal to noise ratios for communications channels generally involves the use of equalizer outputs. The error output of an equalizer is used with the signal output of the equalizer to determine a signal to noise ratio. The error output and signal output may each be averaged over a number of samples before determining the signal to noise ratio.

FIG. 1 is a logical block diagram 100 that depicts a high level overview of an approach for managing power for communications channels based on performance, according to an embodiment of the invention. FIG. 1 is described using a master participant and a slave participant, although the techniques described herein are not limited to communications arrangements that include a master participant and a slave participant. For purposes of explanation, it is assumed that the slave participant includes an equalizer for processing received data. However, the equalizer need not be included with the slave participant and may be included with another participant or device.

In block 110, the master participant sends a packet to the slave participant. For example, the packet may be a Bluetooth packet sent over one of the seventy-nine (79) Bluetooth channels that is selected based on the Bluetooth FH protocol.

In block 120, the slave participant receives the packet from the master participant and provides the received signal to an equalizer. For example, the slave participant may include a decision feedback equalizer (DFE), and the received signal that transmits the packet from the master participant to the slave participant may be processed by one or more components and then provided as input to the DFE.

In block 130, the slave participant uses the equalizer's error output and signal output to determine an estimated signal to noise ratio (SNR). The estimated SNR is used as a performance measure of the communications channel that was used to transmit the packet from the master participant to the slave participant. For example, the equalizer's error output may be used to determine noise power and the signal output used to determine signal power. The signal power divided by the noise power provides the estimated SNR.

In block 140, the slave participant determines a power request by comparing the estimated SNR to a specified SNR. The power request is the amount by which the transmit power for the communications channel should be changed to achieve a desired performance level of the communications channel. For example, the specified SNR may be an implementation dependent value that represents a balance between acceptable communications channel performance and the power required to achieve that performance. By comparing the estimated SNR to the specified SNR, the magnitude and direction of changing the power may be determined so that a later estimate SNR may match the specified SNR. As a specific example, the estimated SNR may be subtracted from the specified SNR to determine a value for the power request.

In block 150, the slave participant stores the power request, for example, in a power request information table. For example, the slave participant may store power request values for each of the Bluetooth communications channels based on packets that are received from the master participant on each communications channel.

In block 160, the slave participant sends power request information to the master participant. For example, after all of the Bluetooth communications channels have had at least one power request value determined, the power request information from the power request information table is sent to master participant.

In block 170, the master participant receives the power request information from the slave participant. For example, the master participant may receive a power request information packet that is sent by the slave participant and that indicates a power request value for each of the seventy-nine (79) Bluetooth communications channels.

In block 180, the master participant updates a transmit power table with the power request information from the slave participant. For example, the master participant may receive a row of power request information from the slave participant that includes a power request value for each communications channel. The master participant may add the row of power request information to a row of transmit power information for the slave participant. In other words, for each channel, the power request value from the slave participant is added to the current transmit power value from the master participant's transmit power table to determine the updated transmit power for the channel, which is then stored back into the master participant's transmit power table.

In block 190, the master participant retrieves the transmit power from the transmit power table and adjusts the transmit power, if necessary. For example, if the master participant is to transmit a packet to the slave participant over a particular communications channel, the master participant may retrieve the transmit power value for that channel for the slave participant from the transmit power table. The retrieved value may be adjusted to meet one or more criteria, such as by ensuring that the value lies within a specified range. For example, if the retrieved transmit power value is outside the specified range, the transmit power value is adjusted to fall within the range.

From block 190, the approach returns to block 110 where the master participant transmit the packet to the slave participant using the transmit power from block 190.

By measuring communications channel performance based on packets being transmitted between the master participant and the slave participant, the approach can be described as a form of "adaptive" power control because the power requests and transmit powers reflect the current interference environment in which the master participant and the slave participant are operating. As interference sources move, increase in strength, decrease in strength, or otherwise change, the approach takes into account that dynamic nature of the interference by continually monitoring communications channel performance and dynamically adjusting the transmit powers based on the changing performance.

The functions performed by the master participant may be performed by the slave participant and vice versa, such that the master participant determines power requests based on packets received from the slave participant and then sends the power request information to the slave participant to use in updating the slave participant's transmit power table.

While the approach of FIG. 1 is described in terms of a single communications channel between a pair of participants, the approach may be implemented for multiple communications channel systems with any number of participants. For example, the functions described in FIG. 1 may be applied to a group of communications channels in a multiple communications channel system such that performance, power requests, and transmit powers are determined for each communications channel in the group. As another example, the functions described in FIG. 1 may be applied to one or more communications channels between two or more participants and between different participants. As yet another example, the functions described in FIG. 1 may be applied to one or more communications channels between each pair of participants in a communications system that includes multiple communications channels and multiple communications participants.

B. Example Communications Arrangement

Figure 2A:
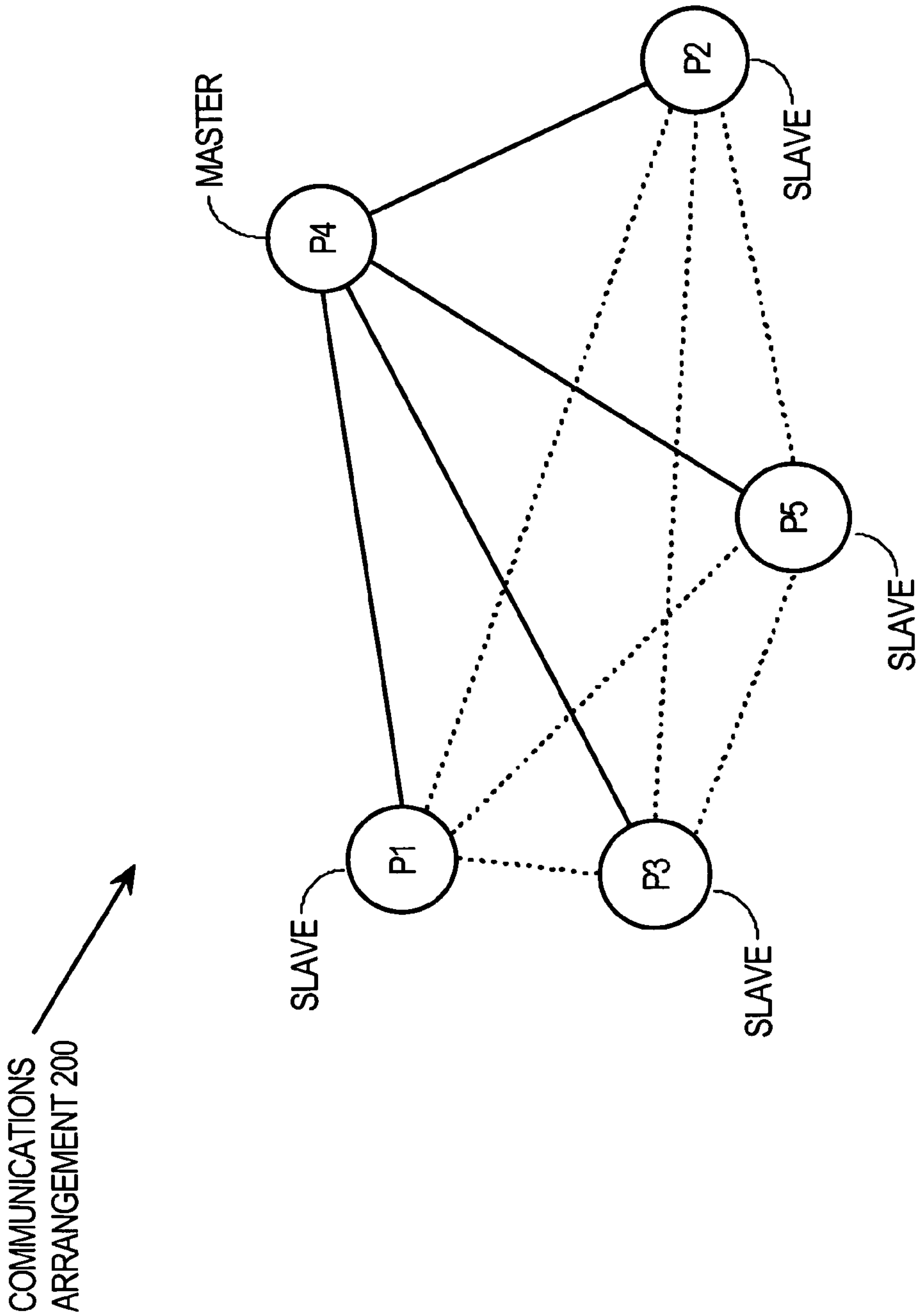
FIG. 2A is a block diagram that depicts a communications arrangement that includes participants P1 through P5, according to an embodiment of the invention.

FIG. 2A is a block diagram that depicts a communications arrangement 200 that includes participants P1 through P5, according to an embodiment of the invention. In the example depicted in FIG. 1, participant P4 is designated as the master participant and is responsible for performing one or more functions. An example function is initiating and managing communications with participants P1, P2, P3, and P5. Master participant P4 may be a device that initiates a connection with participants P1–P5, or master participant P4 may be elected from participants P1–P5 by participants P1–P5 or another entity. The invention is not limited to any particular approach for designating one of the participants as the master participant.

Participants P1 through P5 may be any of a variety of communications devices. Examples of communications devices that may be used in a communications arrangement that uses the techniques described herein include, but are not limited to, wireless devices that are used in wireless local area networks (WLANs) and in wireless personal area networks (WPANs), such as cordless phones, laptop computers, desktop computers, printers, and personal digital assistants (PDAs). Wireless devices may communicate in a variety of ways, including but not limited to, infrared, line of sight, cellular, microwave, satellite, packet radio and spread spectrum technologies. Some communications devices may be characterized as mobile devices based on the relative ease of moving such devices between locations or because the mobile devices may be conveniently carried by a person, such as cordless phones, laptop computers, and PDAs.

The solid lines connecting master participant P4 to slave participants P1, P2, P3 and P5 depict the logical connections between the respective participants over which data is communicated between master participant P4 and a particular participant from slave participants P1, P2, P3 and P5. In addition, when master participant P4 communicates with a particular participant, the other participants may listen to the communication from master participant P4 to the particular participant over the logical connections depicted by the solid lines.

The dotted lines connecting slave participants P1, P2, P3 and P5 to each other depict the logical connections between the respective participants over which the participants may listen to replies from the other participants to master participant P4. In some communications system, the slaves do not communicate with each other but may listen to some or all of the communications from other participants. In other communications systems, the slaves may communicate directly with each other. The invention is not limited to a particular configuration of which participants may communicate together or which participants may listen to communications from one another.

The techniques discussed herein are described with respect to master participants, slave participants, and wireless FH systems such as Bluetooth. However, other communications protocols may be used, including but not limited to, fixed data rate systems and dynamic or rare adaptive systems. For example, Bluetooth is an example of a fixed data rate system in which data is transferred at a fixed rate, such as 1 MB/sec. Because the data rate is fixed, the data rate does not change. As another example, IEEE 802.11 and IEEE 802.15 described scalable data rate systems, also referred to as dynamic or rare adaptive systems, in which the data rate can be adjusted, such as from 1 MB/sec to 11 MB/sec for WLAN. In addition, the techniques applied herein may be used with both single channel and multiple channel communications systems, whether or not implemented according to a wireless communications protocol.

C. Example Communications Mechanism

Figure 2B:
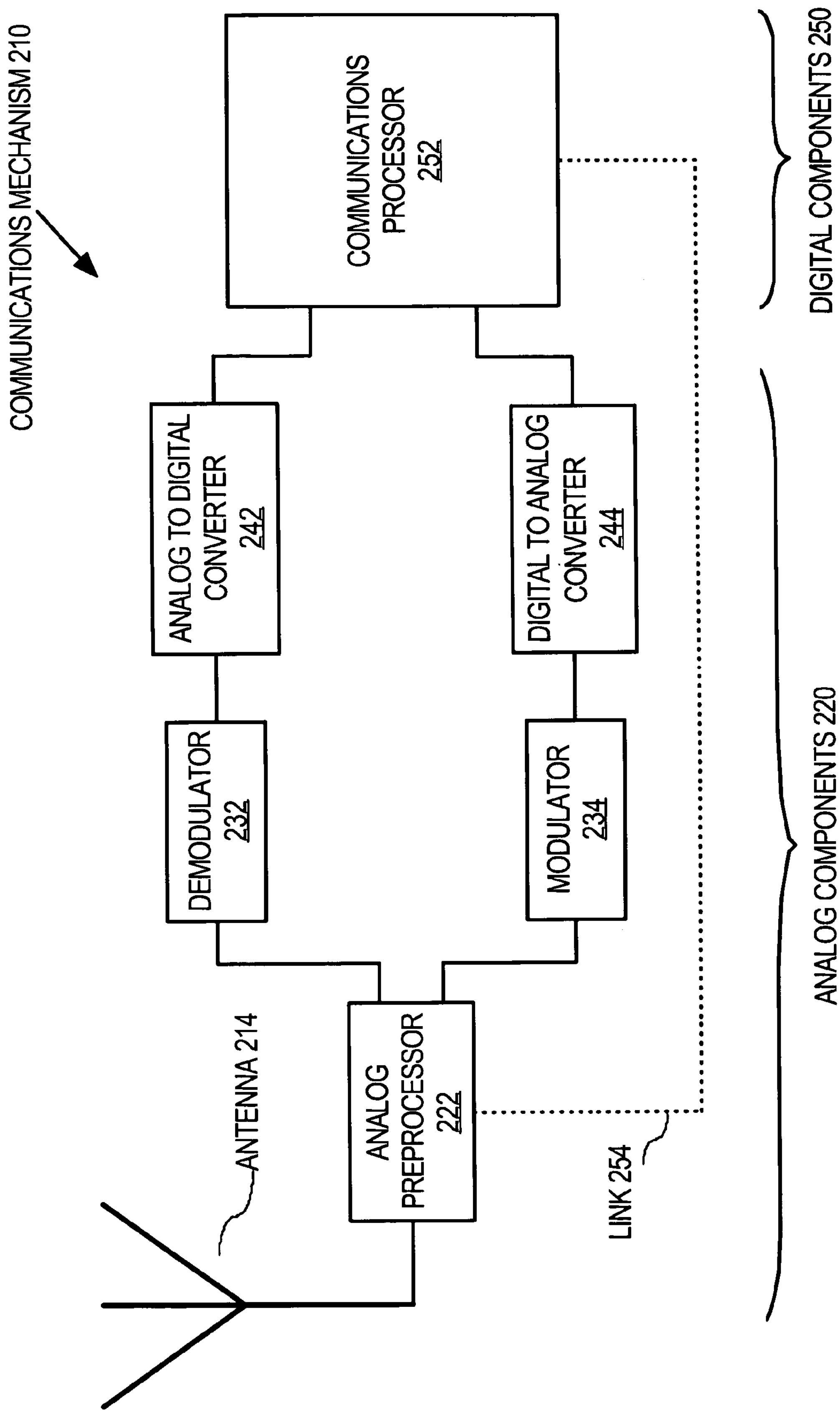
FIG. 2B is a block diagram of a conventional communications mechanism, according to an embodiment of the invention.

FIG. 2B is a block diagram of a conventional communications mechanism 210, according to an embodiment of the invention. Communications mechanism 210 includes an antenna 214 for receiving and transmitting communications signals, such as over radio-frequency (RF), a set of analog components 220, and a set of digital components 250. Analog components 220 include analog preprocessor 222 that is communicatively coupled to antenna 214, a demodulator 232, and a modulator 234. Analog components 220 also include an analog-to-digital converter 242 and a digital-to-analog converter 244, in which the former is communicatively coupled to demodulator 232 and the latter to modulator 234. Digital components 250 includes a communications processor 252 that is communicatively coupled to analog-to-digital converter 242 and digital-to-analog converter 244.

When a communication is received by communications mechanism 210 via antenna 214, analog preprocessor 222 performs perform a variety of functions on the received analog signal, such as analog filtering, amplification, and radio frequency to intermediate frequency conversion. Analog preprocessor 222 provides the processed signal to demodulator 232 for demodulation, which is then provided to analog-to-digital converter 242 to convert the signal from an analog form to a digital form. The digital signal is then provided to communications processor 252.

Communications processor 252 may perform a number of functions on the digital signal, such as equalization and determining one or more performance measurements. Communications processor 252 also interprets the digital signal for routing to other components or devices based on the content of the digital signal. Communications processor 252 may include additional functions or components for performing one or more of the functions described herein, including but not limited to, generating signal to noise ratios, determining power requests, and determining transmit powers. It is assumed for this example that communications processor 252 prepares a new signal, or communication, to be sent from communications mechanism 210.

When a new signal is prepared by communications processor 252, the new digital signal is provided to digital-toanalog converter 244 to convert the new signal from digital form to analog form. The new analog signal is then provided to modulator 234, which modulates the new analog signal before the new analog signal is provided to analog preprocessor 222 for amplification, filtering, and any other operations necessary before transmitting the new analog signal via antenna 214.

Communications mechanism 210 includes a link 254 that communicatively couples communications processor 252 to analog preprocessor 222. Link 254 may be used by communications processor 252 to provide analog preprocessor 222 with the frequency, or the number of the channel, to use for sending the new communication, such as the communication channel to use in a frequency hopping approach. Link 254 may be used for communicating other information from communications processor 252 to analog preprocessor 222, such as the transmit power to be used with the specified communication channel.

D. Example Communications Device

Figure 2C:
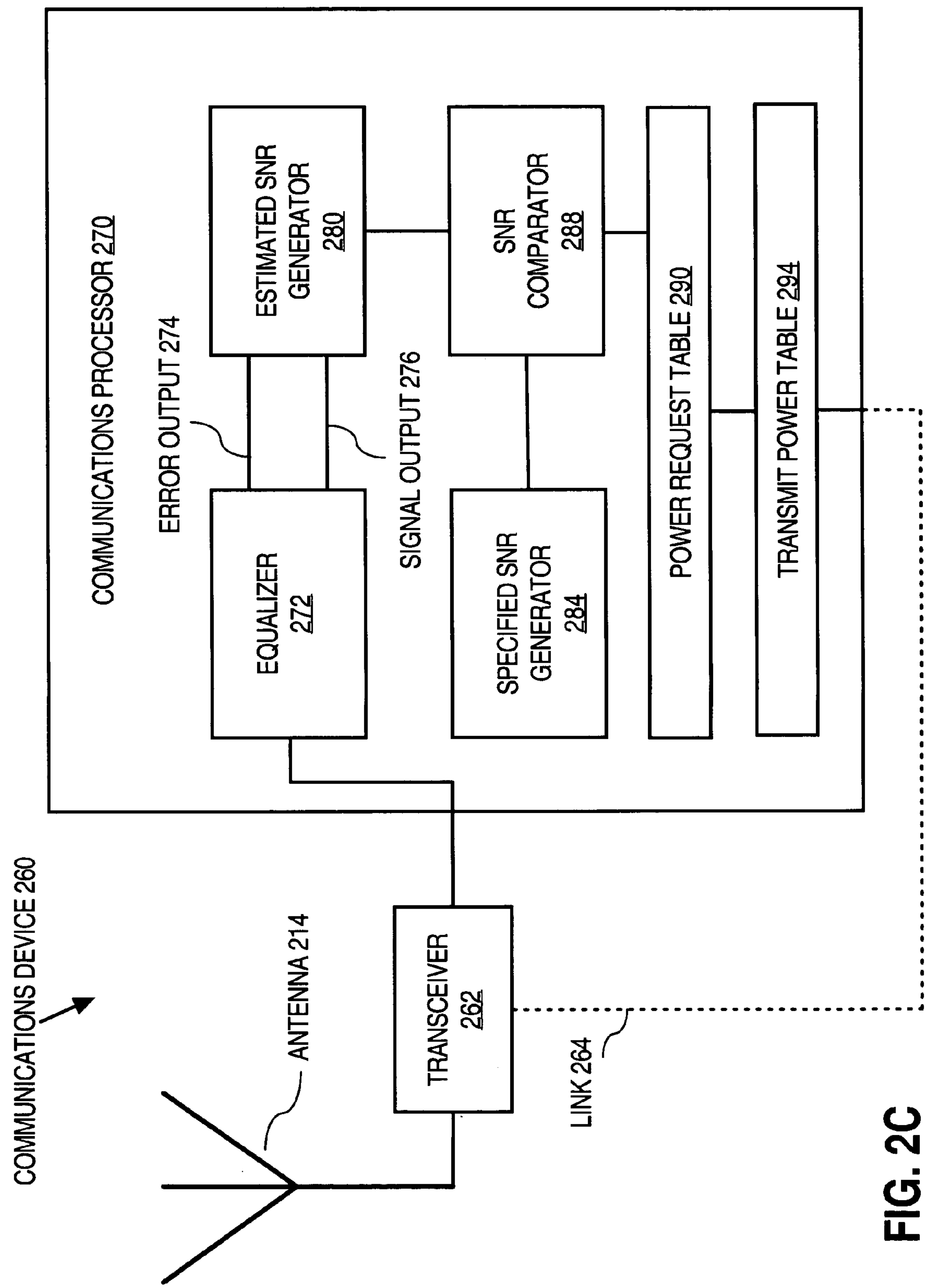
FIG. 2C is a block diagram of a communications device, according to an embodiment of the invention.

FIG. 2C is a block diagram of a communications device 260, according to an embodiment of the invention. Communications device 260 includes a transceiver 262 and a communications processor 270. Transceiver 262 is communicatively coupled to antenna 214 and may include one or more analog components, such as those included in analog components 220 of FIG. 2B.

Communications device 260 may be implemented as any type of communications device, including but not limited to, wireless devices that are used in wireless local area networks (WLANs) and in wireless personal area networks (WPANs), such as cordless phones, laptop computers, desktop computers, printers, and personal digital assistants (PDAs). Wireless devices may communicate in a variety of ways, including but not limited to, infrared, line of sight, cellular, microwave, satellite, packet radio and spread spectrum technologies. Some communications devices may be characterized as mobile devices based on the relative ease of moving such devices between locations or because the mobile devices may be conveniently carried by a person, such as cordless phones, laptop computers, and PDAs.

Communications processor 270 includes an equalizer 272, an estimated SNR generator 280, a specified SNR generator 284, a SNR comparator 288, a power request table 290, and a transmit power table 294. Equalizer 272 receives input from transceiver 262 and provides an error output 274 and a signal output 276, both of which are provided to estimated SNR generator 280.

Estimated SNR generator 280 generates an estimated SNR value based on error output 274 and signal output 276, such as by using the techniques described herein. The estimated SNR value is provided to SNR comparator 288.

Specified SNR generator 284 generates a specified SNR value, such as by using the techniques described herein. The specified SNR value is provided to SNR comparator 288.

SNR comparator 288 compares the estimate SNR value and the specified SNR value to generate a power request value, such as by using the techniques described herein. The power request value is stored in power request table 290.

Communications processor 270 may exchange power request information with another participant in a communications arrangement, such as by providing some or all of the power request values in power request table 290 and receiving similar information from the other participant. Communications processor 270 may use the power request information that is received to update transmit power table 294. Communications processor 270 transmits a power value (referred to herein as a "transmit power" value) from transmit power table 294 to transceiver 262 via link 264, and transceiver 262 transmits a signal using the transmit power value.

E. Determining Channel Performance

Figure 3:
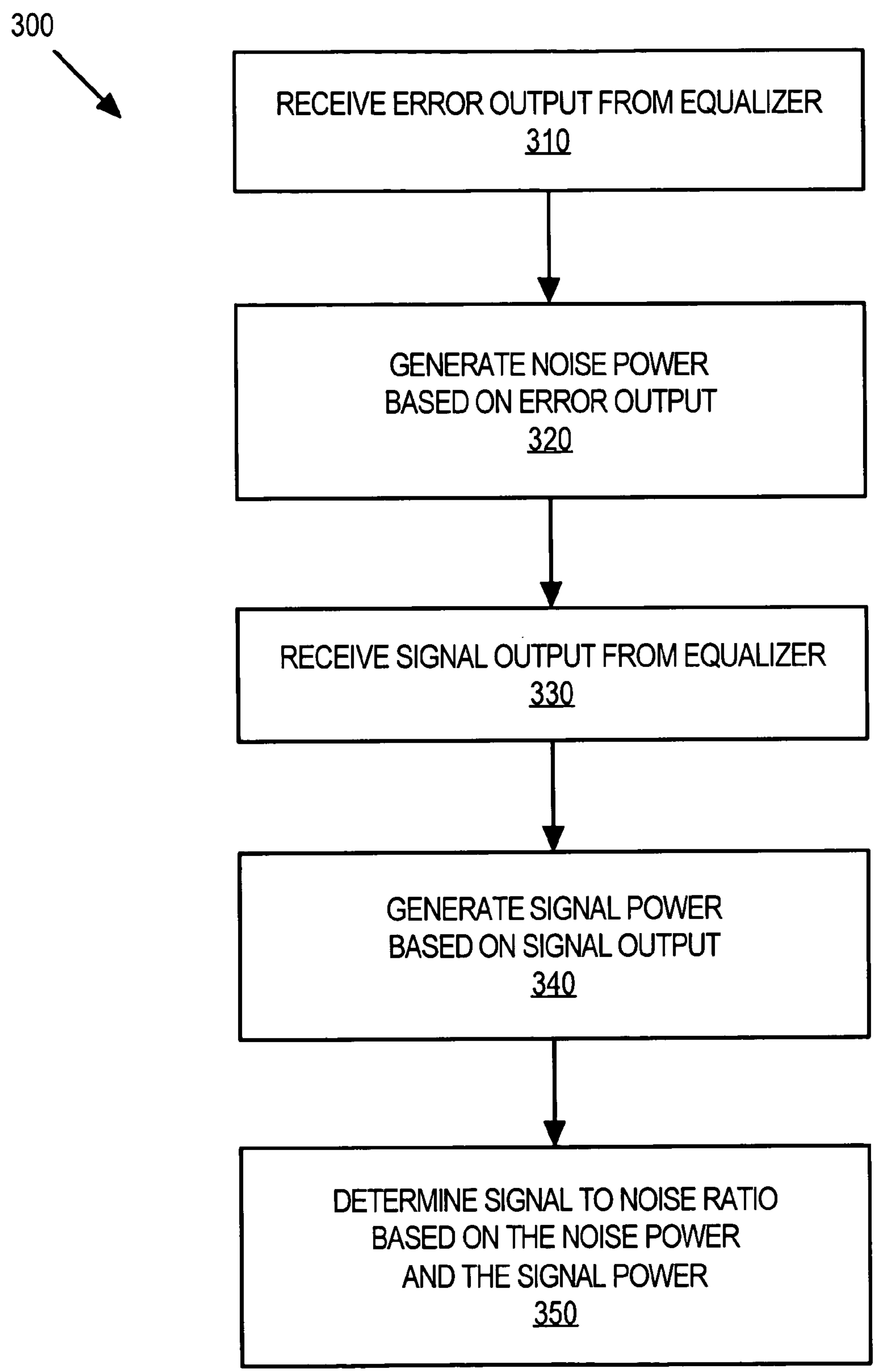
FIG. 3 is a block diagram that depicts an approach for determining a signal to noise ratio as a measure of channel performance based on equalizer outputs, according to an embodiment of the invention.

FIG. 3 is a block diagram 300 that depicts an approach for determining a signal to noise ratio as a measure of channel performance based on equalizer outputs, according to an embodiment of the invention. Although the flow diagrams described herein provide a particular set of steps in a particular order, other implementations may use more or fewer steps and a different order than those shown in the figures discussed herein.

In block 310, error output from an equalizer is received. For example, in FIG. 2C, equalizer 272 may be a decision feedback equalizer (DFE). A DFE is an example of a non-linear equalizer, although other types of non-linear equalizers may be used, as well as linear equalizers, such as transversal filter. Equalizers may include both an error output and a signal output to provide output data after processing received input data.

In block 320, a noise power is generated based on the error output that is received in block 310. For example, the error output may be sampled ten times. Each error sample value may be squared to convert the amplitude-based error measurements into power-based error measurements. The ten samples may then be averaged to determine the noise power, which represents a measure of the error in the received communication.

In block 330, signal output from the equalizer is received. The signal output of the equalizer is the equalized form of the data received as input to the equalizer.

In block 340, a signal power is generated based on the signal output that is received in block 330. For example, the signal output may be sampled ten times. Each signal sample value may be squared to convert the amplitude-based signal measurements into power-based signal measurements. The ten samples may then be averaged to determine the signal power for the received communication.

In block 350, the SNR is determined based on the noise power and the signal power. For example, the signal power from block 340 may be divided by the noise power from block 320 to determine the SNR for the received communication. The SNR thus determined may be converted to decibels (dB) as follows:

$$\mathrm{dB}=10\log_{10}(\text{Power in Watts}). \tag{1}$$

F. Determining Power Requests

Figure 4:
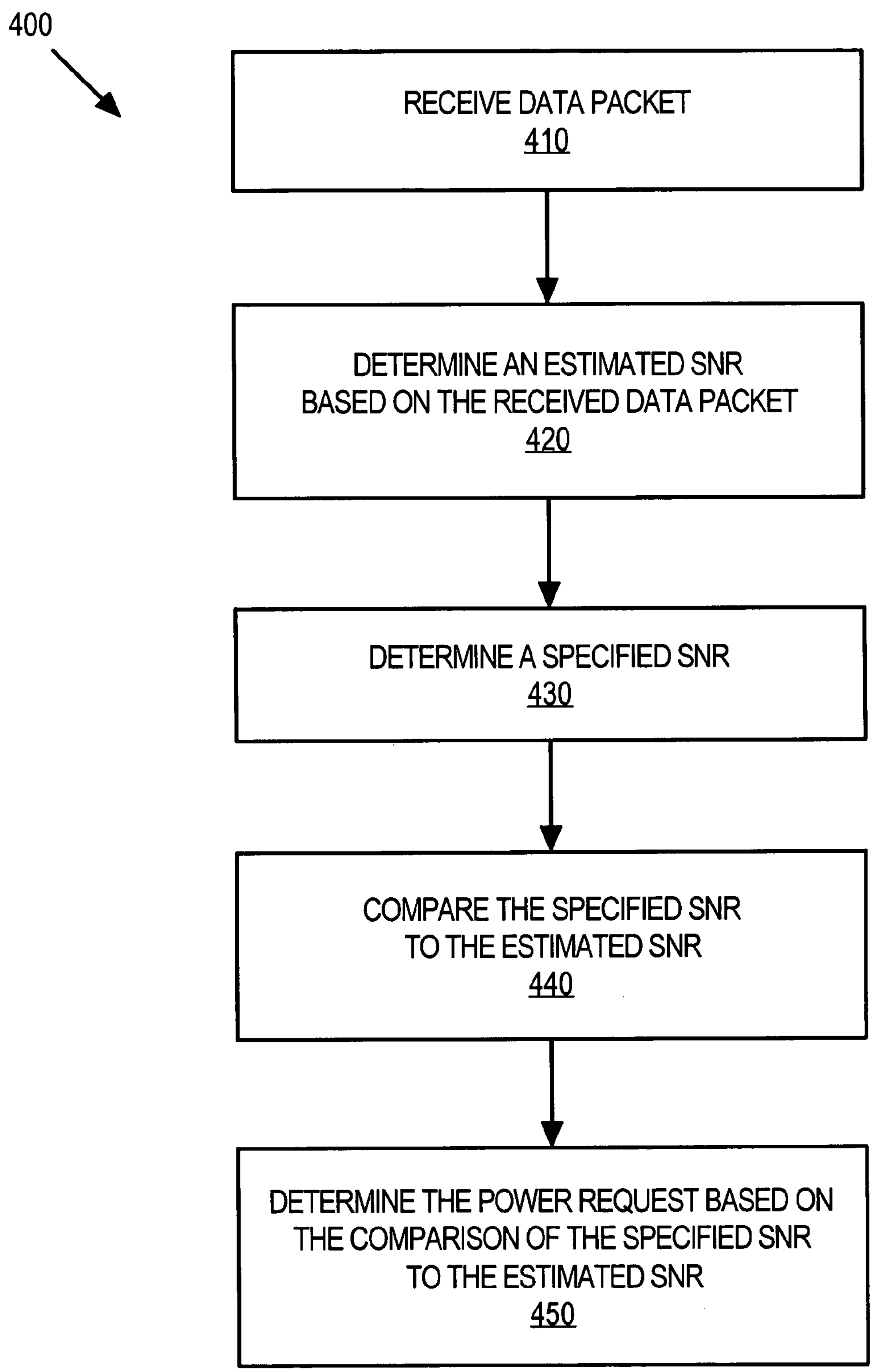
FIG. 4 is a block diagram that depicts an approach for determining a power request based on a performance measurement of a communications channel, according to an embodiment of the invention.

FIG. 4 is a block diagram 400 that depicts an approach for determining a power request based on a performance measurement of a communications channel, according to an embodiment of the invention. The power request may be used as the basis upon which a decision is made whether to change the transmit power for the channel, and if so, by how much to change to the transmit power. While the example depicted in FIG. 4 is based on SNRs, other performance measures may be used, including but not limited to those enumerated herein.

In block 410, a data packet is received. For example, the received communication discussed above with reference to FIG. 3 may be in the form of a packet of data.

In block 420, an estimated SNR is determined based on the received data packet. For example, the approach discussed above with respect to FIG. 3 to determine the SNR based on equalizer outputs may be used to determine the estimated SNR.

In block 430, a specified SNR is determined. The specified SNR represents an SNR value that balances an acceptable performance goal, such as a desired BER, against the power required to achieve the performance goal. The specified SNR value may be provided to the communications arrangement by an operator or calculated based on one or more characteristics or parameters of the communications arrangement. Once determined, the specified SNR may be stored, such as in memory or on disk, and later used without having to be regenerated.

In block 440, the specified SNR is compared to the estimated SNR. For example, a difference SNR, ΔSNR, value may be calculated based on the specified SNR, SNRS, and the estimated SNR, SNRE, as:

$$\Delta SNR = SNRS - SNRE. \quad (2)$$

In block 450, the power request is determined based on the comparison of the specified SNR to the estimated SNR. For example, the absolute value of ΔSNR may be used to represent the magnitude of the change in power desired in appropriate units, such as Watts or dB. The sign for the value of ΔSNR represents the direction of power change for the power request. For example, a positive value for ΔSNR indicates a request to increase the transmit power because the estimated SNR is less than the specified SNR. Similarly, a negative value for ΔSNR indicates a request for a decrease in transmit power because the estimated SNR is greater than the specified SNR.

According to one embodiment, the power request is applicable to the channel upon which the data packet is received and applies to communications from the participant that sent the data packet to the participant that received the data packet. For example, if the data packet was sent from master participant P4 to slave participant P3 over communications channel twenty, the power request value represents the desired change to the transmit power for communications channel twenty between master participant P4 and slave participant P3. Other power requests may be determined for other communications channels between master participant P4 and slave participant P3, or for other communications for the same or different communications channels between different pairings of participants of communications arrangement 200.

G. Power Request Tables and Transmit Power Tables

FIG. 5A is a block diagram that depicts a power request table 500 for a participant, according to an embodiment of the invention. It is assumed for the example depicted in FIG. 5A that power request table 500 is maintained by slave participant P3 for communications that are received from master participant P4 in communications arrangement 200 that uses the Bluetooth FH protocol. However, in general any participant can maintain power request information for communications received from one or more other participants, and other communications protocol besides FH protocols may be used.

Power request table 500 includes row 510 that lists the seventy-nine (79) Bluetooth communications channels, numbered zero (0) to seventy-eight (78), for communications arrangement 200. Power request table 500 includes row 520 that provides the power request values for each of the seventy-nine (79) Bluetooth communications channels based on packets received from master participant P4. For example, the power request values may be determined as discussed above with respect to FIG. 4. As depicted in FIG. 5A, channel 0 has a power request value of −4, channel 1 has a power request value of 1, channel 2 has a power request value of 3, channel 3 a value of 0, channel 77 a value of −2, and channel 78 a value of 3.

In some embodiments, the power request values maintained in row 520 are running averages of separate power request values. For example, the initial values in row 520 may be set to zero at initialization of communications arrangement 200. As slave participant P3 receives packets from master participant P4, power request values may be generated for the channels used by master participant P4. The first power request value that is determined for a communications channel after system initialization may be stored in power request table 500. When a subsequent power request value for the same communications channel is later determined, the first and second power request values may be averaged, and the resulting averaged stored in row 520. Subsequent power request values for the same communications channel may be similarly averaged with the previously determined average.

FIG. 5B is a block diagram that depicts a transmit power table 550 for a participant, according to an embodiment of the invention. Assume for the example depicted in FIG. 5B that transmit power table 550 is maintain by master participant P4 for communications sent by master participant P4 to slave participant P3 in communications arrangement 200. However, in general any participant can maintain transmit power information for communications sent to one or more other participants and other communications protocol besides FH protocols may be used.

Transmit power table 550 includes row 560 that lists the seventy-nine (79) Bluetooth communications channels, numbered zero (0) to seventy-eight (78), for communications arrangement 200. Transmit power table 550 includes row 570 that provides the transmit power values for each of the seventy-nine (79) Bluetooth communications channels for communications sent to slave participant P3. The transmit power values in row 570 may be set a initialization of communications arrangement 200 to a default value, and then are updated during operation of communications arrangement 200 as described immediately below.

FIG. 5C is a block diagram that depicts transmit power table 550 of FIG. 5B for a participant after being updated with the power request information of power request table 500 of FIG. 5A, according to an embodiment of the invention. Assume for the example depicted in FIG. 5C that transmit power table 550 is maintained by master participant P4 and updated based on power request information received from power request table 500 that is received from slave participant P3.

The power request information from slave participant P3 may be transferred to master participant P4 using a suitable data packet that includes the power request values for one or more channels. Similarly, power request information from master participant P4 may be transferred to slave participant P3. One or more criteria may be used to determine when to transfer power request information, such as that each power request value in row 520 has been averaged at least ten times. After transferring power request information, power request table 500 may continue to keep running averages of the power request values, or power request table 500 may have one or more values reset to zero or some other value to begin new running averages.

Figure 6:
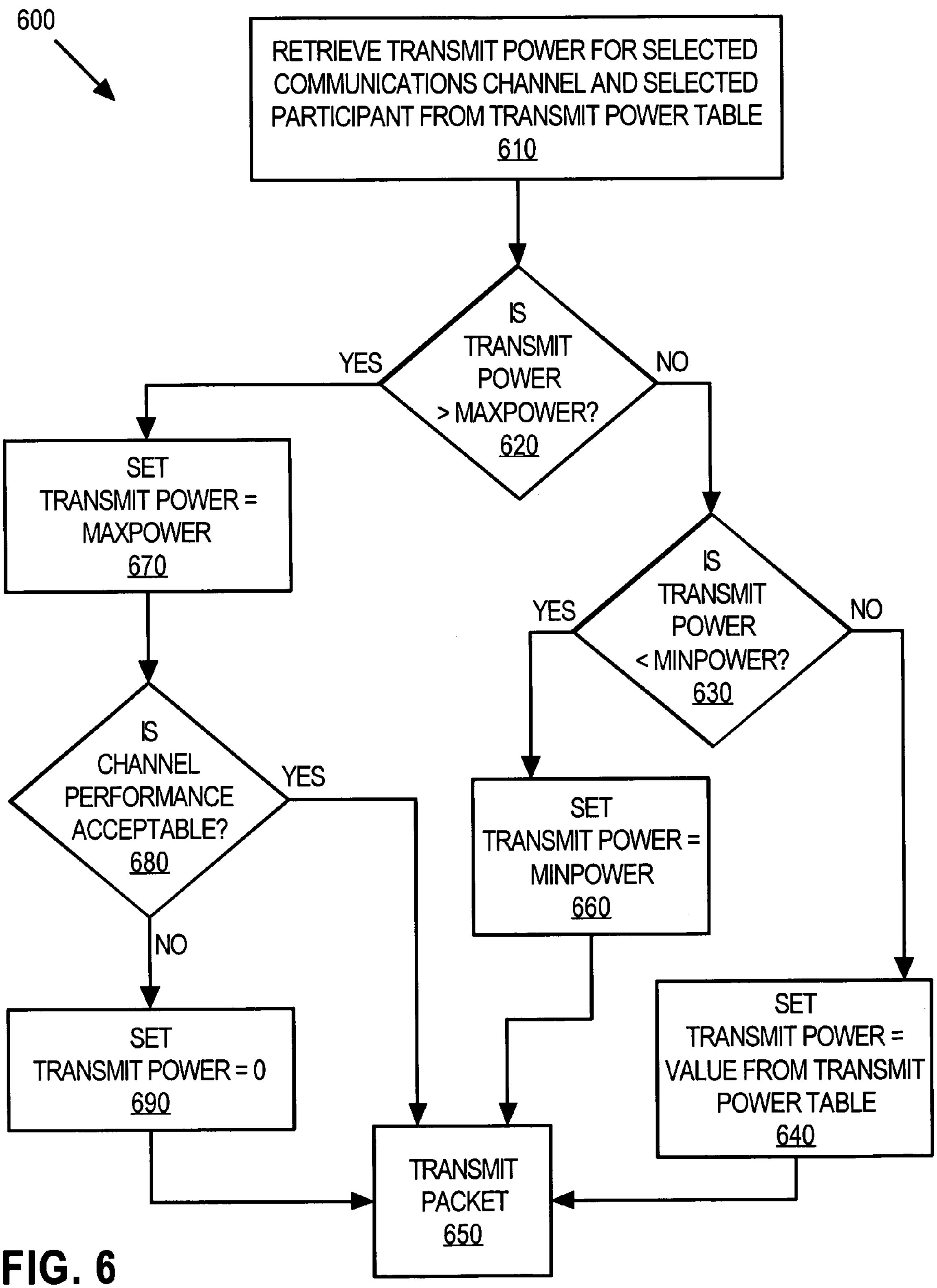
FIG. 6 is a logical block diagram that depicts an approach for determining a transmit power for a communications channel based on the transmit power table of FIG. 5C, according to an embodiment of the invention.

The transmit power values in row 570 in FIG. 5C are determined by adding the power request values of row 520 of FIG. 5A to the transmit power values of transmit power table 550 in FIG. 5B. For example, for channel 1, the original transmit power value from row 570 in FIG. 5B is 5, and the power request value from row 520 of FIG. 5A is −4, resulting in an updated transmit power value of 1 for channel 1 in row 570 of FIG. 5C. Similarly, the remaining transmit power values of row 570 in FIG. 5B are added to the remaining power request values from row 520 in FIG. 5A to determine updated transmit power values in FIG. 5C as follows: 7 for channel 1, 9 for channel 2, 4 for channel 3, 0 for channel 77, and 3 for channel 78. H. Determining Transmit Power FIG. 6 is a logical block diagram 600 that depicts an approach for determining a transmit power for a communications channel based on transmit power table 550 of FIG. 5C, according to an embodiment of the invention. Assume for the example depicted in FIG. 6 that master participant P4 is using transmit power table 550 to determine the transmit power for communicating with slave participant P3 over the Bluetooth FH channels.

In block 610, the transmit power for a selected communications channel and selected participant are retrieved from transmit power table 550. For example, if master participant P4 is to communicate with slave participant P3 over Bluetooth channel 3, the transmit power from row 570 in FIG. 5C is 4.

In block 620, a determination is made whether the transmit power that is retrieved from transmit power table 550 is greater than a "MaxPower" value. The MaxPower value may be specified for communications arrangement 200 based on a variety of factors, such as a desire to conserve battery life and minimize interference to other communications systems. An example MaxPower value is 1 mW. If the transmit power is greater than MaxPower, the approach continues to block 670, which is discussed below.

Assume here that the transmit power is 4 based on channel 3 of row 570 of FIG. 5C and that MaxPower is 6. Because the transmit power is not greater than MaxPower, the approach continues to block 630. In block 630, a determination is made whether the transmit power from transmit power table 550 is greater than a "MinPower" value. The MinPower value may be specified for communications arrangement 200 based on a variety of factors, such as the sensitivity of the hardware included with the participants of communications arrangement 200. An example MinPower value is 0.1 mW. If the transmit power is less than MinPower, the approach continues to block 660, which is discussed below.

Assume here that the transmit power is still 4 and that MinPower is 2. Because the transmit power is not less than MinPower, the approach continues to block 640. In block 640, the transmit power value from row 570 of transmit power table 550 of FIG. 5C is used as the transmit power for master participant P4 to communication with slave participant P3 over Bluetooth communications channel 3 when the packet is transmitted in block 650.

Returning to block 630, assume that the transmit power is 1, such as for channel 0 in transmit power table 550 in FIG. 5C and that the MinPower is 2. As a result of the transmit power being less than the MinPower, the approach continues to block 660 where the transmit power is set to the MinPower value of 2, and then the packet is transmitted using a power of 2 in block 650.

Returning to block 620, assume that the transmit power is 7, such as for channel 1 in transmit power table 550 of FIG. 5C and that the MaxPower is 6. As a result of the transmit power being greater than the MaxPower, the transmit power is set to the MaxPower value 6 in block 670.

In block 680, a determination is made whether the channel performance at a transmit power equal to the MaxPower is acceptable. For example, master participant P4 may access performance data that indicates performance as a function of power. Assume that the channel performance at MaxPower is acceptable. Then the approach continues to block 650 where the packet is transmitted at a transmit Power of 6, the MaxPower value.

If channel performance at MaxPower is determined to not be acceptable in block 680, the approach continues to block 690 where the transmit power is set to 0. The rationale for setting the transmit power to zero is that if acceptable performance cannot be achieved at the MaxPower value, then there is no reason to waste the power transmitting on the particular channel to the selected participant.

For example, assume in block 680 that the transmit power value is 9, such as for channel 2 in transmit power table 550 in FIG. 5C, that the transmit power was set to the MaxPower value of 6 in block 670, and that a determination is made in block 680 that acceptable performance for channel 2 cannot be achieved at a transmit power of 6. The transmit power is then set to 0 in block 690, so that no power is used to transmit the packet in block 650. Therefore, since the packet would likely not be successfully transmitted at a transmit power of 6, no power is wasted in block 650 when master participant P4 transmits over communications channel 2 to slave participant P3 in block 650.

II. DETERMINING COMMUNICATIONS CHANNEL PERFORMANCE USING EQUALIZER OUTPUTS

A. Types of Equalizer Implementations

Equalizers are used for several purposes, including but not limited to, compensating for inter-symbol interference and tracking variations in communications channels that are caused by non-stationary or dynamic environments. Typically, an equalizer has two inputs—a signal input and a reference input—and two outputs—the signal output and the error output.

Equalization techniques may be classified into two categories—linear and non-linear. A transversal filter is an example of a linear equalization approach, and a decision feedback equalizer (DFE) is an example of a non-linear equalization approach. Both linear and non-linear equalizers may use adjustable weight coefficients for performing equalization, with the coefficients adaptively adjusted according to a selected set of optimization criteria. For example, a common optimization criterion is to minimize the mean square error (MSE) in a recursive manner using a particular technique, such as least-mean-square (LMS) or recursive least squares (RLS). The purpose of such techniques is to sequentially adjust the equalizers weighting coefficients to minimize the error output, which is determined as the difference between the reference signal and the current equalizer "decision."

A DFE may be selected for use in wireless communications arrangements because DFEs have the generic ability to compensate for channels that contain "deep zeros" in the impulse response of communications channels. While ideally the impulse response of a communications channel is flat and linear, in practice the signal dips or drops to a low value as a result of fading, leading to the occurrence of deep zeros.

B. Equalizer Operation—Training Period and Decision Directed Mode

Two types of equalizer operations are relevant to the techniques discussed herein, namely the training period (TP) and decision directed mode (DDM). During the TP, a short reference signal, often referred to as a training sequence, is transmitted to initially adjust the weight coefficients, thereby minimizing the error output. In other words, by equalizing a known signal, the degree of corruption of the known signal may be determined and the coefficients adjusted to compensate for the corruption.

After the TP is complete, the equalizer switches to DDM in which the equalizer uses its own decision, or signal output, as a reference instead of the reference signal. In DDM, the error output represents the filtered noise associated with the noise component of the received input signal. The equalized signal is considered to be the signal output of the input signal. As a result, the equalizers error output and signal output may be used for determining the SNR for the input signal.

C. Determining Noise Powers and Signal Powers Based on Equalizer Outputs

Figure 7A:
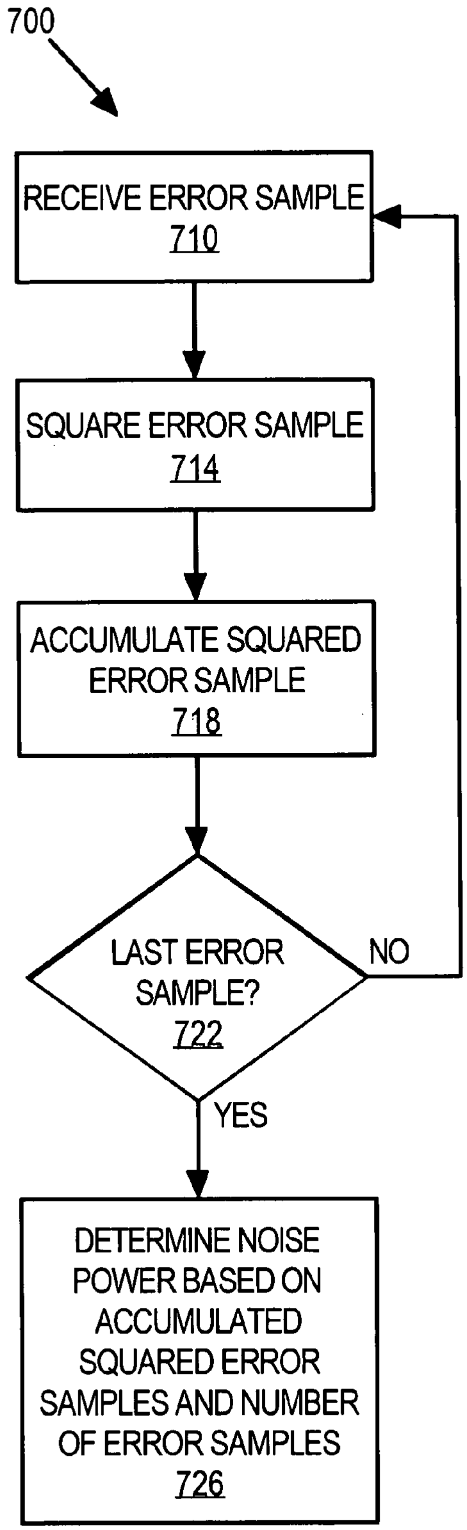
FIG. 7A is a logical block diagram of an approach for determining a noise power based on an equalizer error output, according to an embodiment of the invention.

FIG. 7A is a logical block diagram 700 of an approach for determining a noise 4; power based on an equalizer error output, according to an embodiment of the invention. The example of FIG. 7A is another example of the functions depicted by blocks 310 and 320 of FIG. 3.

In block 710, an error sample is received. For example, the error sample may be taken from the error output of an equalizer. The error sample may represent the value of the error output at a given time or the error output over a period of time. The error sample that is received may be one of a group of error samples that are used to determine the noise power.

In block 714, the error sample is squared. The error output is based on the amplitude of the noise portion of the signal that is received by the device and input to the equalizer. Squaring the error sample converts the amplitude-based error sample into a power-based value because power is proportional to the square of the amplitude.

In block 718, the squared error sample is accumulated. For example, a running total of the square error sample values may be maintained for a group of error samples that are being used to determine the noise power.

In block 722, a determination is made whether the last error sample has been received. If not, the approach returns to block 710 to receive another error sample. If so, the approach continues to block 726, which is discussed below. The number of error samples may be specified before accumulating the errors, or the number of error samples may be counted as the samples are accumulated until some criteria is reached, such as a specified time or until there is no additional error output from the equalizer. Typically, error samples are accumulated for the same packet on a particular communications channel so as to determine the noise in the transmission of the packet on the particular communications channel. However, error samples may be accumulated for more than one packet and over more than one communications channel.

In block 726, the noise power is determined based on the accumulated squared error samples and the number of error samples. For example, if fifteen error samples have been accumulated, the noise power is determined by dividing the accumulated squared error samples by fifteen (e.g., to determine an average squared error sample). As a result, the noise power is determined and used as a measure of the error (e.g., corruption or noise) in the received communication over the communications channel.

Figure 7B:
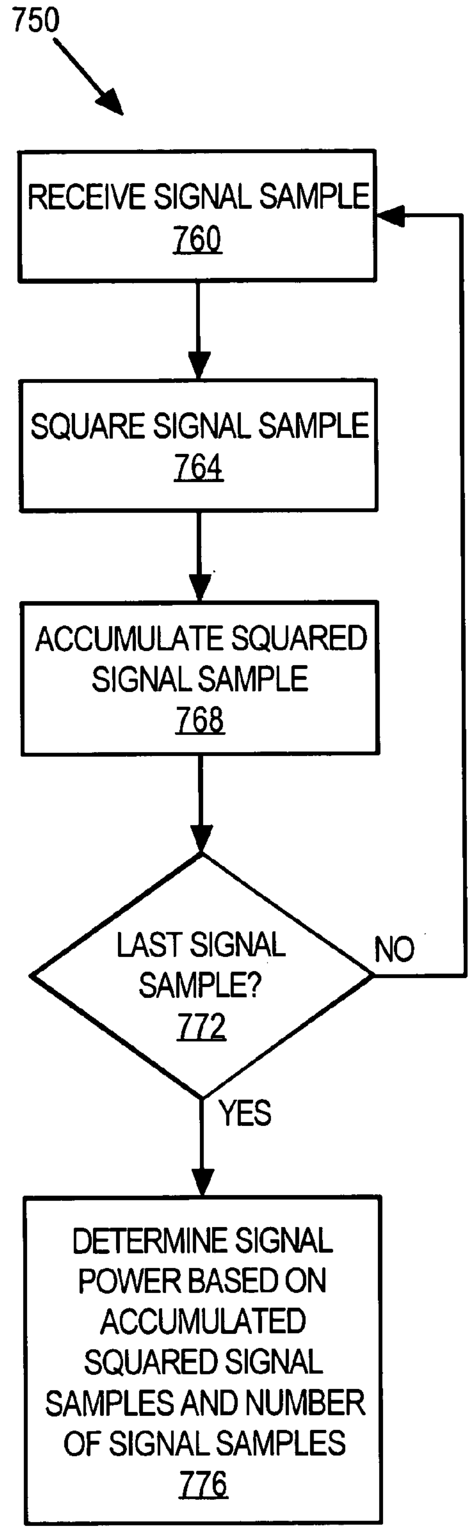
FIG. 7B is a logical block diagram of an approach for determining a signal power based on an equalizer signal output, according to an embodiment of the invention.

FIG. 7B is a logical block diagram 750 of an approach for determining a signal power based on an equalizer signal output, according to an embodiment of the invention. The example of FIG. 7A is another example of the functions depicted by blocks 330 and 340 of FIG. 3.

Blocks 760, 764, 768, 772, and 776 of FIG. 7B are analogous to blocks 710, 714, 718, 722, and 726 of FIG. 7A, respectively, with the difference being that instead of using error samples from the error output of an equalizer as in FIG. 7A, the approach of FIG. 7B uses signal samples from the signal output of an equalizer. As a result, the signal power determined in block 726 represents the power of the signal for the communications channel.

Note that the number of samples used to determine the noise power and signal power may or may not be the same. Typically, the same number of error samples and signal samples are used. However, in some implementations, different numbers of samples may be used, or only a single sample may be used.

D. Generating Estimated Signal to Noise Ratios (SNRs) Based on Noise Powers and Signal Powers According to one embodiment of the invention, a signal to noise ratio for received data is determined based on a noise power and a signal power for the received data. For example, the signal power as determined with the approach of FIG. 7B may be divided by the noise power as determined with the approach of FIG. 7A to calculate an SNR value. An SNR that is determined based on performance measurements, such as by using the error and signal outputs of an equalizer, is referred to herein as an estimated SNR(SNRE) to distinguish from a specified SNR(SNRS), which is discussed below. The SNRE may be converted into appropriate units, such as decibels (dB).

E. Other Performance Measurement Approaches

According to other embodiments, other performance measures besides SNR are used alone or in combination with other measures to determine communications channel performance. For example, redundancy may be included in the structure of the packets used in the communications system and then used to determine channel performance. As a particular example of redundancy, a specified pseudo-random sequence may be appended to the header of some or all of the packets used for communications in the system. Because the participants in the communications system know the pseudo-random sequence, the participants may determine the bit error rate (BER) score, or value, based on detected errors in the pseudo-random sequence. By using a common technique, such as the pseudo-random number sequence and determining the BER, the same performance measurement may be used for some or all of the channels of the communications system, which may help to simplify the tracking and combining of performance data.

As another example, a received signal strength indicator (RSSI) is used to test the performance of communications channels. One approach for determining the RSSI for a channel is to have a master send a NULL packet to a participant. A NULL packet generally includes only an access code and a packet header. NULL packets are often used to ensure that a slave is still synchronized to the communications network.

When a participant receives a NULL packet, the participant does not send a return packet to the master. By listening to the return channel from the synchronized participant, the signal received by the master represents the noise floor of the channel since the participant is not transmitting on the channel. If there is interference, such as from another communications system, the RSSI will be high. Conversely, if there is no interference, the RSSI will be low. Channel performance may be measured on a scale from very low RSSI values to very high RSSI values corresponding to the noise level measured on the channel, thereby providing a range of channel performance measurements.

As another example, the known preamble at the start of the packet is used to test the performance of communications channels. For example, identification packets, NULL packets, POLL packets, or any other kind of packet may be used to correlate the received preamble against the known preamble. A packet that does not pass the correlation is discarded (e.g., it is a lost packet). Also, the errors that occur may be used to determine a BER score/value.

As another example, a header error check (HEC) may be used to test the performance of communications channels. The HEC is a check on the contents of the packet header, such that if an error occurs in the packet header, the packet does not pass the check and the packet is discarded (e.g., it is a lost packet).

As another example, a cyclic redundancy check (CRC) may be used to test the performance of communications channels. The CRC may be a check of either the payload of the packet or the complete contents of the packet, depending on the communications system protocol being used. As an example, in Bluetooth and IEEE 802.15.1, the data packet must pass a CRC check, otherwise the packet must be retransmitted. A retransmission request (RR) indicates poor channel performance.

As yet another example, forward error correction (FEC) may be used for channel performance testing of transmissions between participants of a communications system. FEC may be used on either a packet header or on the payload of the packet. FEC is used as a form of redundant data encoding to allow the recipient to ensure the integrity of the received data and to correct any identified errors. As an example, in Bluetooth or IEEE 802.15.1, the packet header is ⅓ FEC coded, and the payload is ⅔ FEC coded. FEC coding may be used for both an NEB calculation and for error correction.

The descriptions of each channel performance measurement technique above describe the use of the same method for all transmissions, such as master to slave and slave to master transmissions. However, different methods may be used for each direction of transmission, and different methods may be used for different transmissions in the same direction. For example, the RSSI approach may be used for master to slave transmissions while the preamble correlation is used for slave to master transmissions. In addition, different methods may be combined, such that to have a test considered successful, two or more tests must provide an acceptable result. For example, to receive a "pass" indication, a packet may have to pass both the preamble correlation and the HEC tests. Furthermore, the tests used may change over time depending upon the effectiveness of the tests and the requirements of a particular application or implementation. Finally, other approaches that provide an indication of channel performance besides those described herein may be used.

III. POWER REQUESTS

Power requests represent a change in the transmit power to be used for one or more communications channels. According to one embodiment, a power request is determined based on comparing measured performance data to a reference, or specified, performance standard to determine the magnitude and direction that the transmit power should be changed. For example, the estimated SNR as determined above may be compared to a specified SNR to determine a desired change in transmit power. The resulting power request may be stored, such as in a table that maintains running averages of power request values for one or more channels in the communications arrangement.

A. Specified SNR

According to one embodiment, a power request is determined based on a specified SNR. The specified SNR represents a desired or ideal SNR value and is determined so as to balance acceptable communications channel performance with the power required by a communications mechanism. The approach used to determine the specified SNR and the value selected depends on the particular implementation and how an operator wants to balance performance against the power requirements. For example, the specified SNR may be selected or determined to achieve a desired BER. While a high SNRS provides better performance than a low SNRS, the high SNRS generally requires expending more power, which may have an effect on battery lifetime, recharge times, size, and cost, all of which vary for different implementations.

The SNRS may be determined separate from the operation of the communications arrangement and provided as an input, such as from an operator or administrator of the communications system, or the communications system may determine the SNRS based on a number of input values, including but not limited to, one or more of the following: parameters that describe the communications arrangement and participants and performance measures of the communications arrangement. Typically, the SNRS is determined empirically during development of the system because the SNRS is often, but not always, dependent on the hardware. For example, the same signal may be received successfully by one participant in a communications arrangement but not by another participant in the same communications arrangement because the latter participant uses hardware with poor sensitivity.

B. Determining a Power Request by Comparing Estimated SNR to Specified SNR

According to one embodiment of the invention, a power request is determined based on a comparison of the estimated SNR, SNRE, to the specified SNR, SNRS. Forexample, a difference SNR, ΔSNR, may be determined as discussed above as:

$$\Delta SNR = SNRS - SNRE. \quad (2)$$

SNRE may be determined in a variety of ways, such as by using the approaches of FIG. 7A and FIG. 7B to determine the noise power and signal power, respectively, based on the equalizer error and signal outputs, as discussed above. SNRS may be determined in a variety of ways, such as the approach outlined in the immediately preceding subsection.

The value of ΔSNR represents both the magnitude of the power request and the desired direction of the change in the transmit power. For example, the absolute value or magnitude of ΔSNR may represent the amount of change in the transmit power, and the sign on ΔSNR may represent the direction to change the power.

For example, a positive ΔSNR results from SNRS being greater than SNRE, which indicates that the measured SNR is low and therefore the noise is affecting the signal to an undesirable degree. Therefore, a positive ΔSNR represents an increase in transmit power so that SNRE may be raised up to the desired SNRS, thereby ensuring adequate communications channel performance. Similarly, a negative ΔSNR results from SNRS being less than SNRE, and therefore the signal is more than strong enough to overcome the noise. Therefore, a negative ΔSNR represents a decrease in transmit power so that the SNRE may be decreased to the desired SNRS, thereby conserving power for the transmitting participant and reducing interference on other communications systems while maintaining acceptable performance.

The power request corresponds to the communication channel or channels and participants upon which the performance data is based. For example, if the SNRE is determined for a particular communications channel of an FH communications system for communications from a master participant to a particular slave participant, the power request is applicable to the communications over particular communications channel from the master participant to the slave participant. While the power request could be used for other communications channels, other slave participants, or for communications from the particular slave participant to the master participant, the power request may not be suitable because the power request is not based on performance data for such other communications channels, participants, or direction of communications.

Furthermore, the power request need not be limited to performance data for a particular communications channel, pair of participants, and direction of communication. For example, performance data for both communications directions may be used to determine a power request that would be suitable for communications in both directions. As another example, performance data for more than one communications channel between a particular pair of participants may be used to determine a power request suitable for the group of communications channels.

Additional performance data for additional communications channels, participants, and communications directions may be included in the error samples and signal samples used to determine the noise power and signal power. Also, power requests for multiple channels, participants, and communication directions may be combined, such as by averaging, to determine a suitable power request.

C. Power Request Tables

FIG. 8A is a block diagram that depicts a master power request table 800, according to an embodiment of the invention. Assume for the example depicted in FIG. 8A that master power request table 800 is maintained by master participant P4 of communications arrangement 200 that operates according to the Bluetooth FH protocol. However, in general any participant may maintain power request information for one or more other participants and for one or more channels in any type of communications systems besides Bluetooth based FH systems.

Master power request table 800 includes row 810 that lists the seventy-nine (79) Bluetooth communications channels, number 0 to 78, for communications arrangement 200. Master power request table 800 also includes rows 820, 822, 824, 826 that correspond to slave participants P1, P2, P3, and P5, respectively, and contain the power requests for each of the seventy-nine (79) Bluetooth communications channels based on communications received for each slave participant by master participant P4. For example, each power request value in master power request table 800 may be determined as discussed above with respect to FIG. 7A and FIG. 7B and the immediately preceding subsections.

While the values depicted in master power request table 800 are integer values ranging from −4 to 5 for explanation purposes, in practice any value may be used for a power request. In addition, a power request is not limited to numerical values. For example, a power request may specify whether the transmit power is to be increased, decreased, or remain unchanged, as indicated by a code system, such as using an "I" to increase the transmit power, a "D" to decrease the transmit power, and a "U" to leave the transmit power unchanged. The communications system may be configured to increase or decrease the transmit power by a specified amount upon receipt of a power request of "I" or "D", respectively.

According to one embodiment, the power requests in master power request table 800 are individual power request values that are based on a single communication on the corresponding channel from the designated slave participant to master participant P4. Thus, power request values are organized and identified according to the participant and communications channel to which each power request value applies. Master power request table 800 is an example of such an approach.

According to another embodiment, the power requests are based on more than one communication. For example, master power request table 800 may initially be filled with a default values, such as zero, when communications arrangement 200 is initialized. During normal operation, master participant P4 may determine a power request value for each packet that is received from a slave participant. After generating a power request value, the corresponding entry in master power request table 800 is updated for the new power request value.

For example, each power request value in master power request table 800 may be maintained as a running average of all power requests for the corresponding slave participant and communications channel. As each new power request value is generated, the appropriate running average in master power request table 800 is updated. Assume that the initial power request value for communications channel 2 for slave participant P1 is zero. Assume further that the first power request value determined for communications channel 2 for a packet form slave participant P1 is −1, and then that a second power request value is determined as −3. Master power request table 800 contains the initial value of zero prior to the first communication with slave participant P1 over communications channel 2, then a value of −1, and then a value of −2 (average of −1 and −3, the first and second power request values).

In some implementations, each block of master power request table 800 includes both the running average of the power request and a count of the number of power requests included in the running average. As additional power requests are averaged into the running average, both the running average and the count of the number of power requests stored in the appropriate block of master power request table 800 are updated.

While some implementations may continue to use a continuous running average for the power request values for as long as the communications arrangement is functioning, other implementations may limit the running average to fewer than all of the power requests that are generated. For example, after power request information is provided to another participant, the power request values may be reset to an initial or default value. As another example, the running average may be based on a specified number of power request values, such as the last thirty power request values.

FIG. 8B is a block diagram that depicts a slave power request table 850, according to an embodiment of the invention. Assume for the example depicted in FIG. 8B that slave power request table 850 is maintained by slave participant P3 of communications arrangement 200 that operates according to the Bluetooth FH protocol. However, in general any participant may maintain power request information for one or more other participants and for one or more channels in any type of communications systems besides Bluetooth based FH systems.

Slave power request table 850 includes row 860 that lists the seventy-nine (79) Bluetooth communications channels, number 0 to 78, for communications arrangement 200. Slave power request table 850 also includes row 870 that contains the power requests for each of the seventy-nine (79) Bluetooth communications channels based on communications received from master participant P4. For example, each power request value in slave power request table 850 may be determined as discussed above with respect to FIG. 7A and FIG. 7B and the immediately preceding subsections. As with master power request table 800, other alphanumeric entries may be included in slave power request table 850, and each power request may be based on one or more communications received over the particular channel from master participant P4.

Slave power request table 850 may contain additional power request rows, such as row 870. For example, in communications systems in which slave participant P3 may communicate with other participants besides master participant P4, slave power request table 850 may include a power request row for one or more additional participants. In addition, as with master power request table 800, slave power request table 850 may include power requests that are based on one or more performance measurements from one or more communications.

While the power request information described herein is in the form of a table organized by communications channel and participant, the power request information is not limited to a table format. For example, a database may be used to organize the power request information, or more generally, any suitable data organization may be used.

IV. TRANSMIT POWER TABLES

A. Transmit Power Tables

FIG. 9A is a block diagram that depicts a master transmit power table 900, according to an embodiment of the invention. Assume for the example depicted in FIG. 9A that master transmit power table 900 is maintained by master participant P4 of communications arrangement 200 that operates according to the Bluetooth FH protocol. However, in general any participant may maintain power request information for one or more other participants and for one or more channels in any type of communications systems besides Bluetooth based FH systems. For explanation purposes, master transmit power table 900 is described with reference to master power request table 800 of FIG. 8A and slave power request table 850 of FIG. 8B.

Master transmit power table 900 includes row 910 that lists the seventy-nine (79) Bluetooth communications channels, number 0 to 78, for communications arrangement 200. Master transmit power table 900 also includes rows 920, 922, 924, 926 that that correspond to slave participants P1, P2, P3, and P5, respectively, and contain the transmit powers for each of the seventy-nine (79) Bluetooth communications channels for use when master participant P4 communicates with slave participants P1, P2, P3, and P5. For example, each transmit power in master transmit power table may represent a relative transmit power in millidecibels, dBm, which is computed based on the desire power as follows:

$$\text{dBm}=10\log_{10}(\text{Power in milliwatts}). \tag{10}$$

While the values depicted in master transmit power table 900 are integer values ranging from 0 to 10 for explanation purposes, in practice any value may be used for a power request. In addition, a transmit power is not limited to numerical values. For example, a transmit power may specify whether the transmit power is to be low, medium, or high, as indicated by a code system, such as using an "L" to indicate a low transmit power, a "M" to indicate a medium transmit power, and a "H" to indicate a high transmit power. The communications system may be configured to use a transmit power that is specified to correspond to the "L", "M", and "H" indicators, respectively.

At the initialization of communications arrangement 200, the transmit powers in master transmit power table 900 may be set to specified values, such as by setting all the transmit powers to an initial default value of "5." However, one or more transmit powers in master transmit power table 900 may be initialized to any value.

FIG. 9B is a block diagram that depicts a slave transmit power table 950, according to an embodiment of the invention. Assume for the example depicted in FIG. 9A that slave transmit power table 950 is maintained by slave participant P3 of communications arrangement 200 that operates according to the Bluetooth FH protocol. However, in general any participant may maintain power request information for one or more other participants and for one or more channels in any type of communications systems besides Bluetooth based FH systems. For explanation purposes, slave transmit power table 950 is described with reference to master transmit power table 900 of FIG. 9A, master power request table 800 of FIG. 8A, and slave power request table 850 of FIG. 8B.

Slave transmit power table 950 includes row 960 that lists the seventy-nine (79) Bluetooth communications channels, number 0 to 78, for communications arrangement 200. Slave transmit power table 950 also includes row 970 that contains the transmit powers for each of the seventy-nine (79) Bluetooth communications channels when slave participant P3 communicates with master participant P4.

Slave transmit power table 950 may contain additional transmit power rows, such as row 970, such as in communications systems in which slave participant P3 may communicate with other participants besides master participant P4. As with master transmit power table 900, the transmit powers in slave transmit power table 950 may be in units of dBm or any other suitable units and any suitable values, codes, or other indicators may be used for the transmit powers, not just integers from 0 to 10. Further, the values in slave transmit power table 950 may be initialized to any transmit power values that are appropriate for a particular implementation.

While the power transmit information described herein is in the form of a table of transmit powers that are organized and identified by communications channel and participant, the power transmit information is not limited to a table format. For example, a database may be used to organize the transmit power information, or more generally, any suitable data organization may be used.

B. Transferring Power Request Table Information

According to one embodiment of the invention, power request information is transferred from one participant to another participant and used to update the transmit power information maintained by the participant that receives the power request information. For example, master participant P4 may provide the power request information from row 824 of master power request table 800 to slave participant P3, and slave participant P3 may use the power request information from row 824 to update slave transmit power table 950. Similarly, slave participant P3 may provide the power request information from row 870 of slave power request table 850 to master participant P4, and master participant P4 may use the power request information from row 870 to update master transmit power table 900.

In general, any two or more participants in a communications arrangement may exchange corresponding power request information and use the power request information to update each participant's power transmit table. However, not all implementations require the exchange of information, and one participant may provide power request information to another participant without receiving any power request information in return. Furthermore, while an entire row of a power request table typically is sent, some implementations may only provide one or more power request values from a row. Also, more than one row of power request information may be provided.

After a participant provides power request information to another participant, the participant providing the power request information may continue to maintain the power request values as running averages. Alternatively, the participant providing the power request information may reset the power request values, such as to zero or some other value or set of values, after providing the power request information to another participant.

C. Power Request Information Packet

Figure 10:
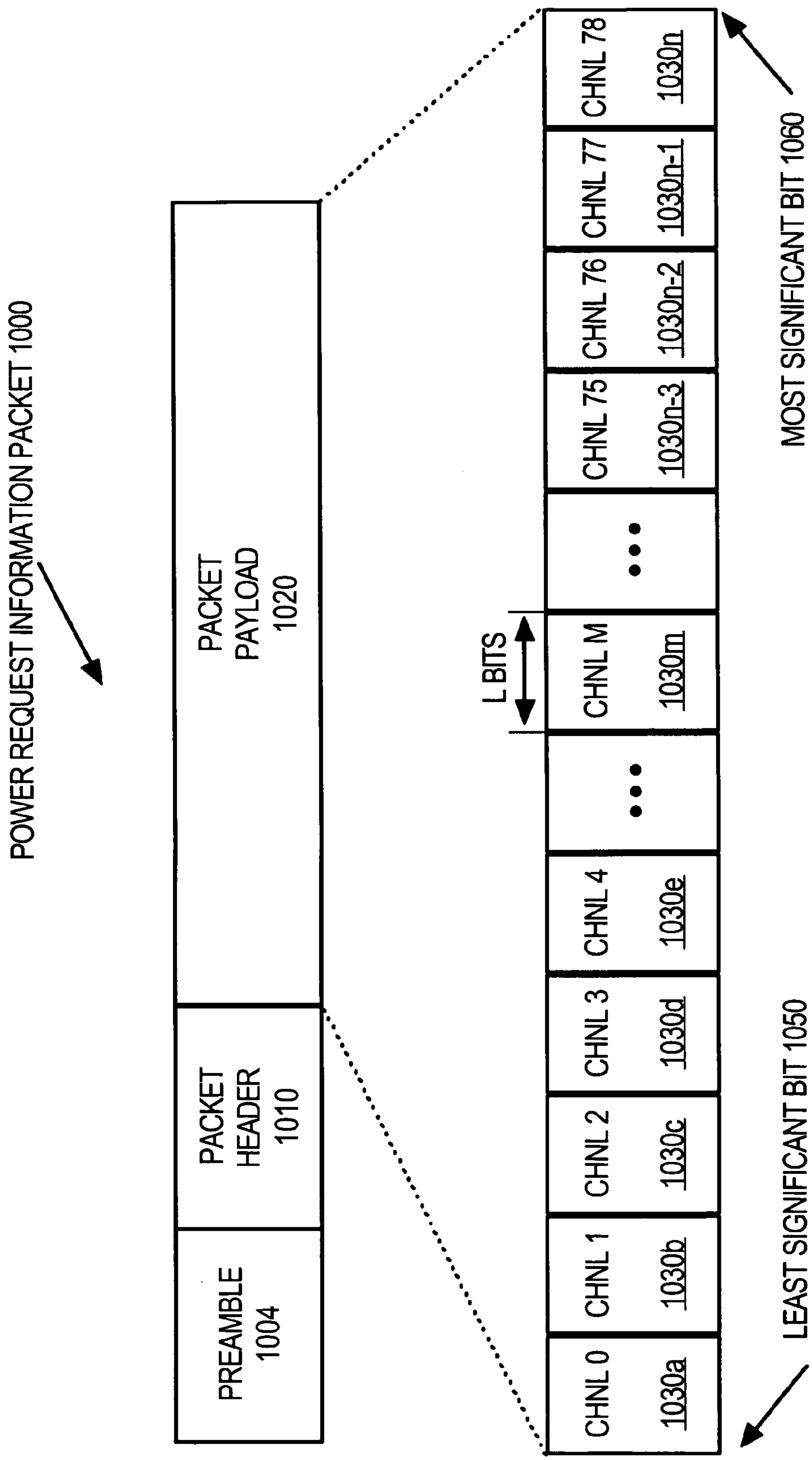
FIG. 10 is a block diagram that depicts a power request information packet, according to an embodiment of the invention.

FIG. 10 is a block diagram that depicts a power request information packet 1000, according to an embodiment of the invention. While power request information packet 1000 includes a power request value for each communications channel in the communications arrangement for a single participant, other implementations may include power requests for fewer than all of the communications channels or for more than one participant. For explanation purposes, power request information packet 1000 is depicted for a Bluetooth FH communications system that uses all seventy-nine (79) Bluetooth communications channels, although the techniques described herein are not limited to Bluetooth or FH communications systems.

Power request information packet 1000 includes a preamble 1004, a packet header 1010 and a packet payload 1020. Preamble 1004 can be used for several purposes, including but not limited to, identifying the communications arrangement, detecting signals, and synchronization. For example, in a Bluetooth FH system, preamble 1004 would be the channel access code.

Packet header 1010 includes control information, such as the origination and destination address of the packet, the type of packet, and the priority level for the packet. Packet payload 1020 includes the contents or data being carried by power request information packet 1000, as compared to the control information, or overhead, of header 308.

As depicted in FIG. 10, packet payload 1020 includes data items **1030*a*–1030*n*. One data item is included for each of the seventy-nine (79) Bluetooth communications channels, which are numbered 0 through 78. For example, data item 1030*a* corresponds to communications channel 0, data item 1030*b* to channel 1, data item 1030*m* to channel M, and data item 1030*n* to channel 78. Each of data items 1030*a*–1030*n* are depicted in FIG. 10 as having a length of L bits, with data item 1030*a* beginning at a least significant bit 1050 of packet payload 1020 and data item 1030*n* ending at a most significant bit 1060 of packet payload 1020. However, other lengths for data items 1030*a*–1030*n*** may be used, and data items having different lengths in the same payload may be used.

Each of data items **1030*a*–1030*n* may include a signed word of L bits that represents the power request value for the corresponding channel. The magnitude of the signed word may represent the amount of power change desired, and the sign of the signed word may represent the direction to change the power by the amount specified by the magnitude of the signed word. For example, if power request information packet 1000 is sent from slave participant P3 based on the power request information depicted in slave power request table 850 of FIG. 8B, data item 1030*a*** would contain an L bit word having the value of "4" that indicates the power change desired has a magnitude of "4" and the power should be decreased as indicated by the negative sign.

While the techniques described herein are discussed in terms of using a power request information packet to transfer power request information from one participant to another, other approaches for transferring power request information may be used. For example, instead of using a packet that is designed for transferring power request information, such as power request information packet 1000, any packet may be used with the power request information included in the payload or some other portion of the packet. As another example, each participant may store the power request information at a location that is accessible to other participants for later retrieval. Furthermore, the power request information may be transferred via an intermediary instead of directly from the participant providing the information to the participant that is to receive the information to use to update the receiving participant's transmit power table.

D. Updating Transmit Power Tables with Power Request Information

According to one embodiment of the invention, a participant updates a power transmit table based on power request information from another participant. For example, a participant may receive a row of power request information from a power request table via a power request information packet, such as that depicted in FIG. 10. Upon receipt of power request information, a power transmit table may be updated using vector-wise addition of the two rows as follows:

$$\text{Transmit power}_{updated}(i)=\text{Transmit power}_{old}(i)+\text{Power request}(i). \quad (11)$$

For example, FIG. 5A, FIG. 5B, and FIG. 5C show the vector-wise addition of row 520 of power request table 500 with row 570 of transmit power table 550 to obtain the updated version of row 570.

Transmit power tables may be updated during operation of the communications arrangement so that the transmit powers reflect the current operating conditions for the communications arrangement. For example, the participants in a communications arrangement may be configured to provide power request information after the running averages in the power request table for the power request value for each communications channel has been averaged fifty times. Because the power request values may be based on normal communications, the running averages in the power request tables reflect the current operating conditions for the communications arrangement. Having current power request information may be of importance for communications networks that include mobile devices or wireless devices due to the dynamic nature of the interference that will be encountered. Therefore, by exchanging power request information on a regular basis, each participant may keep the participant's transmit power table values current, thereby providing improved power control, communications channel performance, and throughput of the communications arrangement.

V. DETERMINING THE TRANSIT POWER

The transmit powers included in a power transmit table or other suitable form are used to determine the power with which to transmit to another participant. The transmit power retrieved from a power transmit table may be modified based on or more criteria prior to the transmission. For example, the transmit power may be checked to ensure that the transmit power is within an acceptable range of transmit powers. FIG. 6, as discussed above, provides one example for selecting the transmit power for a packet based on the participant to which the transmission is to be made, the communications channel to be used, a MinPower value, and a MaxPower value. In some embodiments, the values for MinPower and MaxPower may be determined empirically during development of the system.

A. Selecting the Transmit Power Table Value as the Transmit Power

According to one embodiment, a transmit power is selected based on the transmit power table value. For example, if master participant P4 is to send a packet to slave participant P2 over communications channel 1, master participant P4 may use master transmit power table 900 to determine that the transmit power to be used is "8." Similarly, slave participant P3 may use slave transmit power table 950 to determine that the transmit power should be "1" to transmit to master participant P4 over communications channel 77. Assume for this example that the transmit power retrieved from the transmit power table satisfies any applicable criteria, such as a MinPower value or a MaxPower value, or that there are no such criteria to be applied. As a result, the transmit power value retrieved from the transmit power table is used as the transmit power when sending the packet to the intended recipient.

B. Selecting a Higher Power Value as the Transmit Power

According to another embodiment, a minimum power value is selected as the transmit power. For example, assume in the example above for slave participant P3 transmitting to master participant P4 that the MinPower value is "2." Therefore, instead of transmitting at the power transmit table value of "1", slave participant P3 uses the MinPower value of "2" instead.

According to yet another embodiment, a value greater than the transmit power table value is used, although the value is not necessarily a minimum power value. For example, a participant may be configured to use a default transmit power value that is adjusted based on the transmit power table value. As a specific example, assume that the default transmit power is "5" and that the transmit power table value is "1." The participant may be configured to reduce the default power value of "5" by "1" to "4" if the power transmit power table value is less than the default value.

C. Selecting a Lower Power Value as the Transmit Power

According to another embodiment, a maximum power value is selected as the transmit power. For example, assume in the example above for master participant P4 transmitting to slave participant P3 that the MaxPower value is "7." Therefore, instead of transmitting at the power transmit table value of "8", master participant P4 uses the MaxPower value of "7" instead.

According to yet another embodiment, a value less than the transmit power table value is used, although the value is not necessarily a maximum power value. For example, a participant may be configured to use a default transmit power value that is adjusted based on the transmit power table value. As a specific example, assume that the default transmit power is "5" and that the transmit power table value is "8." The participant may be configured to increase the default power value of "5" by "1" to "6" if the power transmit power table value is greater than the default value.

D. Selecting a Nominal Transmit Power

According to another embodiment, a nominal power value is selected as the transmit power. For example, assume in the example above for master participant P4 transmitting to slave participant P3 that the MaxPower value is "7." Therefore, instead of transmitting at the power transmit table value of "8", master participant P4 selects the MaxPower value of "7" instead. However, before transmitting, master participant P4 checks the performance of communications channel 1 at the MaxPower value to determine if using a transmit power of "7" will achieve acceptable performance.

For example, master participant P4 may check a performance data table that indicates the performance of the communications channels as a function of power, such as might be generated based on previous packet transmissions. If the performance data table indicates that a packet transmitted at a power of "7" is not likely to be successful, master participant P4 may reselect the transmit power at a lower value than "7" to conserve battery resources since the transmission is not likely to succeed.

According to yet another embodiment, a nominal value is used when transmitting at a higher power will not achieve acceptable performance. For example, instead of just using a lower power than a MaxPower value, the participant may be configured to use a very low power level, such as "1" in the examples discussed herein. As another example, the participant may use zero power, or power that is about zero such as a very minimum value, to conserve battery resources. Even though a low or zero power is used, the participant transmits the packet.

E. Modifying Power Transmit Tables

The examples discussed in the immediately preceding subsections and with respect to FIG. 6 describe the selection and use of transmit power values that differ from the values retrieved from the transmit power tables. According to another embodiment, the transmit power table values are modified according to one or more criteria. For example, instead of retrieving a transmit power value and then adjusting the transmit power based on a MinPower or MaxPower value, the transmit power value in the transmit power table may be adjusted. The modification of the table values may be made prior to storing or updating the table values, or as a separate operation after the table values are stored or updated but prior to the table values being retrieved. As a result, when the transmit power values are later retrieved for use, the transmit power values satisfy the applicable criteria.

VI. IMPLEMENTATION MECHANISMS

The approach for managing power for communications channels based on performance described herein may be implemented in a variety of ways and the invention is not limited to any particular implementation. The approach may be integrated into a communications arrangement, network, or system or a communications device, or may be implemented as a stand-alone mechanism. Furthermore, the approach may be implemented in computer software, hardware, or a combination thereof.

Figure 11:
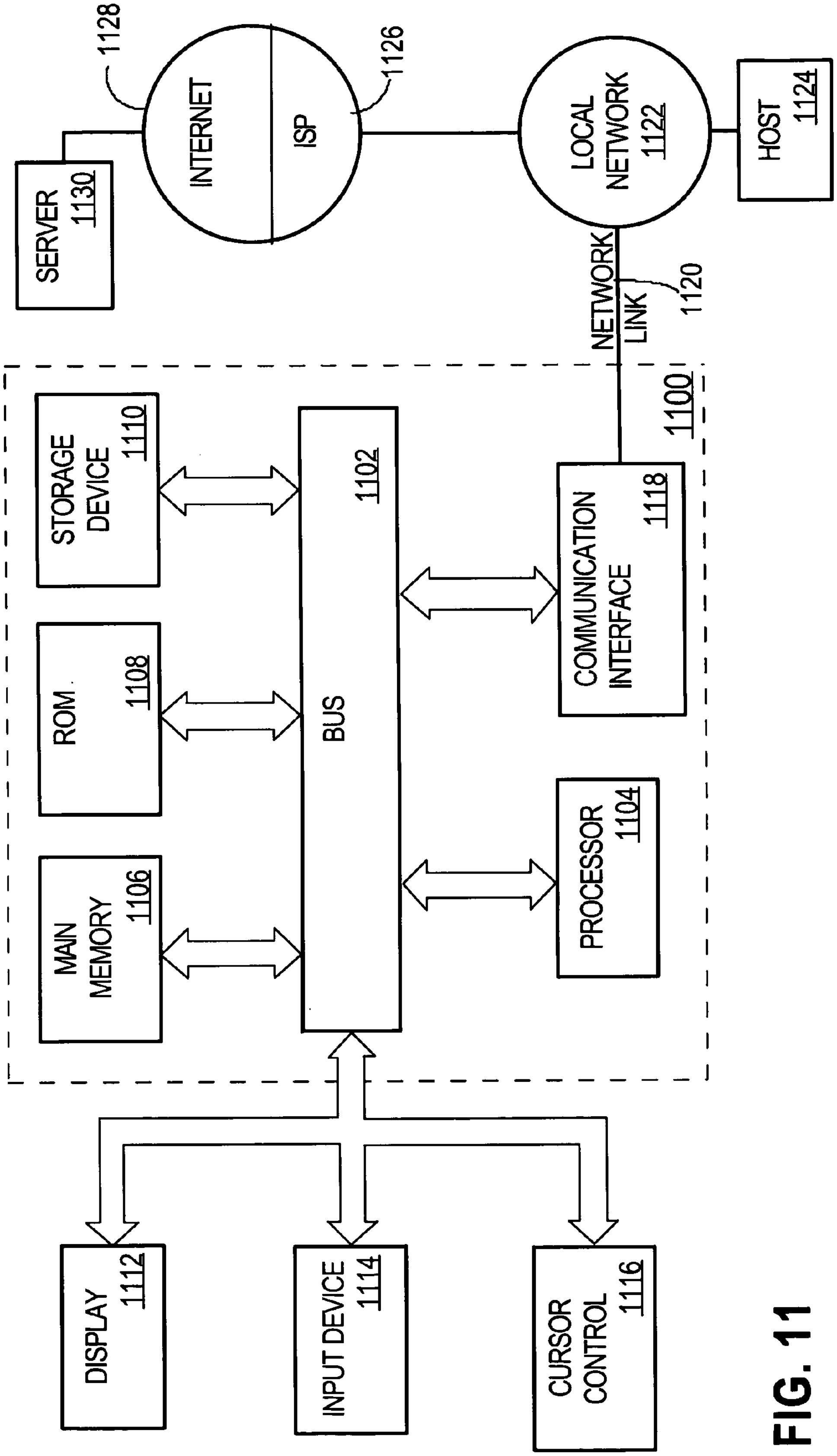
FIG. 11 is a block diagram that depicts a computer system upon which embodiments of the invention may be implemented.

FIG. 11 is a block diagram that depicts a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media may also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

VII. EXTENSIONS AND ALTERNATIVES

In the foregoing specification, the invention has been described with reference to specific embodiments thereof. It will, however, be evident that various modifications and changes may be made thereto without departing from the broader spirit and scope of the invention. For example, although examples have illustrated the use of a communications arrangement that operates based on the Bluetooth wireless FH protocol, the Bluetooth protocol is used for explanation purposes only as embodiments of the invention are not limited to any particular type of communications protocol. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for managing power for a plurality of communications channels based on communications channel performance, the method comprising the computer-implemented steps of:

generating performance data based on communications at a first power over a first communications channel of the plurality of communications channels and communications at a second power over a second communications channel of the plurality of communications channels;

based on the performance data, determining a third power that is different than the first power;

causing the third power to be used for subsequent communications over the first communications channel;

based on the performance data, determining a fourth power that is different than the second power, wherein the fourth power is different than the third power; and causing the fourth power to be used for subsequent communications over the second communications channel.

2. The method of claim 1, further comprising the computer-implemented step of:

based on additional performance data, modifying at least one of the third power and the fourth power.

3. The method of claim 1, wherein:

the first communications channel and the second communications channel communicatively couple a first participant and a second participant;

the first participant is selected from the group consisting of a master participant, a first wireless device, and a first mobile device; and the second participant is selected from the group consisting of a slave participant, a second wireless device, and a second mobile device.

4. The method of claim 1, wherein:

the first communications channel and the second communications channel communicatively couple a first participant and a second participant; and the first participant and the second participant are associated with a communications arrangement that uses a protocol that is selected from the group consisting of a first frequency hopping protocol and a second frequency hopping protocol that is defined by Institute of Electrical and Electronics Engineers 802.15.1 Wireless Personal Area Network Standard.

5. The method of claim 1, wherein the step of determining the third power includes the computer-implemented step of:

determining the third power based on performance data for the first communications channel and one or more attributes of a participant, wherein the one or more attributes of the participant include an identifier that distinguishes the participant from one or more other participants.

6. The method of claim 1, wherein:

a first participant and a second participant are communicatively coupled by both the first communications channel and the second communications channel;

the step of determining the third power includes the computer-implemented step of determining the third power based on performance data that is based on communications between the first participant and the second participant over the first communications channel; and the step of determining the fourth power includes the computer-implemented step of determining the fourth power based on performance data that is based on communications between the first participant and the second participant over the second communications channel.

7. The method of claim 6, wherein the first participant and a third participant are communicatively coupled by the first communications channel, and wherein the method further comprises the computer-implemented step of:

based on performance data that is based on communications between the first participant and the third participant over the first communications channel, determining a fifth power for communications that use the first communications channel and that are between the first participant and the third participant.

8. The method of claim 1, wherein:

a first participant and a second participant are communicatively coupled by the first communications channel;

the step of determining the third power includes the computer-implemented step of:

determining the third power based on performance data that is based on communications from the first participant to the second participant over the first communications channel, wherein the third power is used for subsequent communications from the first participant to the second participant over the first communications channel; and the method further comprises the computer-implemented step of:

determining a fifth power based on performance data that is based on communications from the second participant to the first participant over the first communications channel, wherein the fifth power is used for communications from the second participant to the first participant over the first communications channel, and wherein the fifth power is different from the third power.

9. The method of claim 1, wherein the step of generating the performance data includes the computer-implemented steps of:

generating an estimated signal to noise ratio based on one or more communications between a first participant and a second participant over the first communications channel; and generating the performance data for the first communications channel, based on the estimated signal to noise ratio and a specified signal to noise ratio.

10. The method of claim 9, wherein the step of generating the estimated signal to noise ratio includes the computer-implemented steps of:

generating a noise power, based on an error output of an equalizer that receives input from the first communications channel;

generating a signal power, based on a signal output of the equalizer; and determining the estimated signal to noise ratio, based on the noise power and the signal power.

11. The method of claim 1, further comprising the computer-implemented step of:

determining a power request value based on a measured performance value and a specified performance value.

12. The method of claim 1, further comprising the computer-implemented steps of:

generating performance data for the first communications channel based on one or more communications between a first participant and a second participant;

causing the performance data to be transferred from the second participant to the first participant; and wherein the one or more communications are from the first participant to the second participant, and the second participant generates the performance data based on the one or more communications.

13. The method of claim 12, further comprising the computer-implemented step of:

causing additional performance data to be transferred from the first participant to the second participant, wherein the additional performance data is based on one or more additional communications from the second participant to the first participant.

14. The method of claim 12, wherein the step of causing the performance data to be transferred includes the computer-implemented steps of:

generating a packet that includes the performance data, wherein the packet includes at least one signed word of a specified length to represent a magnitude and direction of power change; and transferring the packet from the second participant to the first participant.

15. The method of claim 1, wherein the step of determining the third power includes the computer-implemented steps of:

determining an initial power based on the performance data;

determining whether the initial power satisfies one or more criteria;

when the initial power satisfies the one or more criteria, using the initial power as the third power;

when the initial power fails to satisfy the one or more criteria:

generating a modified power; and using the modified power as the third power.

16. The method of claim 15, wherein the one or more criteria include a minimum power, wherein the initial power is less than the minimum power, and the method further comprises the computer-implemented steps of:

generating the modified power based on the minimum power; and using the modified power as the third power.

17. The method of claim 15, wherein the one or more criteria include a maximum power, wherein the initial power is greater than the maximum power, and the method further comprises the computer-implemented steps of:

generating the modified power based on the maximum power; and using the modified power as the third power.

18. The method of claim 17, wherein performance of the first communications channel using the third power fails to satisfy one or more channel performance criteria, and the method further comprises the computer-implemented step of:

reducing the third power to less than the maximum power.

19. The method of claim 18, wherein the step of reducing the third power includes the computer-implemented step of:

reducing the third power to a particular power that is selected from the group consisting of a fifth power that is less than a minimum power and a sixth power that is about zero power.

20. The method of claim 1, wherein the performance data is based on determining signal to noise ratios of the first and second communications channels based on equalizer outputs by performing the following steps for each of the first and second communications channels; generating a noise power, based on an error output of an equalizer that receives input from a communications channel; generating a signal power, based on a signal output of the equalizer; and determining a signal to noise ratio, based on the noise power and the signal power.

21. The method of claim 20, wherein the step of generating the noise power includes the computer-implemented steps of:

receiving two or more error samples from the error output of the equalizer;

generating two or more squared error samples by squaring each of the two or more error samples;

averaging the two or more squared error samples to generate the noise power;

receiving two or more signal samples from the signal output of the equalizer;

generating two or more squared signal samples by squaring each of the two or more signal samples; and averaging the two or more squared signal samples to generate the signal power.

22. The method of claim 20, wherein:

the step of generating the noise power includes the computer-implemented steps of:

receiving a specified number of error samples from the error output of the equalizer;

generating the specified number of squared error samples by squaring each of the specified number of error samples; and averaging the specified number of squared error samples to generate the noise power;

the step of generating the signal power includes the computer-implemented steps of:

receiving the specified number of signal samples from the signal output of the equalizer;

generating the specified number of squared signal samples by squaring each of the specified number of signal samples; and averaging the specified number of squared signal samples to generate the signal power.

23. The method of claim 20, wherein the equalizer receives input from one communications channel.

24. The method of claim 20, wherein the equalizer receives input from each of a plurality of communications channels, and the steps of generating the noise power, generating the signal power, and determining the signal to noise ratio are performed for two or more communications channels of the plurality of communications channels.

25. The method of claim 24, wherein:

the plurality of communications channels are based on a frequency hopping protocol; and the equalizer is associated with a device that is selected from the group consisting of a wireless device and a mobile device.

26. The method of claim 20, wherein the equalizer is selected from the group consisting of a linear equalizer, a transversal filter, a nonlinear equalizer, and a decision feedback equalizer.

27. The method of claim 20, wherein the equalizer operates in a decision directed mode.

28. The method of claim 20, wherein the communications channel is the first communications channel, the signal to noise ratio is a first signal to noise ratio, and the method further comprises the computer-implemented steps of:

based on the first signal to noise ratio, determining the third power for transmitting communications over the first communications channel; based on an additional error output of the equalizer that receives input from a second communications channel, generating an additional noise power; based on an additional signal output of the equalizer that receives input from the second communications channel, generating an additional signal power; based on the additional noise power and the additional signal power, determining a second signal to noise ratio; and based on the second signal to noise ratio, determining a fifth power for transmitting communications over the second communications channel.

29. A communications device comprising a power control mechanism configured to:

generate performance data based on communications at a first power over a first communications channel of the plurality of communications channels and communications at a second power over a second communications channel of the plurality of communications channels;

based on the performance data, determine a third power that is different than the first power;

cause the third power to be used for subsequent communications over the first communications channel;

based on the performance data, determine a fourth power that is different than the second power, wherein the fourth power is different than the third power; and cause the fourth power to be used for subsequent communications over the second communications channel.

30. The communications device of claim 29, wherein the power control mechanism is further configured to:

based on additional performance data, modify at least one of the third power and the fourth power.

31. The communications device of claim 29, wherein the communications device is selected from the group consisting of a master participant, a slave participant, a wireless device, and a mobile device.

32. The communications device of claim 29, wherein the communications device is a first communications device, wherein the first communications device communicates with a second communications device over the first communications channel, and wherein the power control mechanism is further configured to:

determine the third power based on performance data that is based on communications from the first communications device to the second communications device over the first communications channel, wherein the third power is used for subsequent communications from the first communications device to the second communications device over the first communications channel; and determine a fifth power based on performance data that is based on communications from the second communications device to the first communications device over the first communications channel, wherein the fifth power is used for communications from the second communications device to the first communications device over the first communications channel, and wherein the fifth power is different from the third power.

33. The communications device of claim 29, wherein the performance data is based on signal to noise ratios of the first and second communications channels that are generated by a mechanism configured to:

generate a noise power, based on error data that is generated by an equalizer;

generate a signal power, based on signal data that is generated by the equalizer; and determine a signal to noise ratio, based on the noise power and the signal power.

34. The communications device of claim 33, wherein the mechanism is further configured to:
- receive a specified number of error samples from the equalizer;
- generate a specified number of squared error samples by squaring each of the specified number of error samples;
- average the specified number of squared error samples to generate the noise power;
- receive the specified number of signal samples from the equalizer;
- generate a specified number of squared signal samples by squaring each of the specified number of signal samples; and
- average the specified number of squared signal samples to generate the signal power.

35. The communications device of claim 33, wherein the equalizer is selected from the group consisting of a linear equalizer, a transversal filter, a nonlinear equalizer, and a decision feedback equalizer.

36. The communications device of claim 33, further comprising the equalizer.

37. The communications device of claim 33, wherein the communications device is selected from the group consisting of a mobile device and a wireless device.

38. A computer-readable medium carrying one or more sequences of instructions for managing power for a plurality of communications channels based on communications channel performance, wherein execution of the one or more sequences of instructions by one or more processors causes the one or more processors to perform the steps of:
- generating performance data based on communications at a first power over a first communications channel of the plurality of communications channels and communications at a second power over a second communications channel of the plurality of communications channels;
- based on the performance data, determining a third power that is different than the first power;
- causing the third power to be used for subsequent communications over the first communications channel:
- based on the performance data, determining a fourth power that is different than the second power, wherein the fourth power is different than the third power; and
- causing the fourth power to be used for subsequent communications over the second communications channel.

39. The computer-readable medium of claim 38, wherein the performance data is based on determining signal to noise ratios of the first and second communications channels based on equalizer outputs, and wherein the computer-readable medium further comprises one or more sequences of instructions which, when executed by the one or more processors, causes the one or more processors to perform for each of the first and second communications channels the steps of:
- based on an error output of an equalizer that receives input from a communications channel, generating a noise power; based on a signal output of the equalizer, generating a signal power; and based on the noise power and the signal power, determining a signal to noise ratio.

40. The computer-readable medium of claim 39, wherein the instructions for generating the noise power include one or more sequences of instructions which, when executed by the one or more processors, causes the one or more processors to perform the steps of:
- receiving two or more error samples from the error output of the equalizer;
- generating two or more squared error samples by squaring each of the two or more error samples;
- averaging the two or more squared error samples to generate the noise power;
- receiving two or more signal samples from the signal output of the equalizer;
- generating two or more squared signal samples by squaring each of the two or more signal samples; and
- averaging the two or more squared signal samples to generate the signal power.

41. The computer-readable medium of claim 39, wherein:
- the instructions for generating the noise power include one or more sequences of instructions which, when executed by the one or more processors, causes the one or more processors to perform the steps of:
  - receiving a specified number of error samples from the error output of the equalizer;
  - generating the specified number of squared error samples by squaring each of the specified number of error samples; and
  - averaging the specified number of squared error samples to generate the noise power;
- the instructions for generating the signal power include one or more sequences of instructions which, when executed by the one or more processors, causes the one or more processors to perform the steps of:
  - receiving the specified number of signal samples from the signal output of the equalizer;
  - generating the specified number of squared signal samples by squaring each of the specified number of signal samples; and
  - averaging the specified number of squared signal samples to generate the signal power.

42. The computer-readable medium of claim 39, wherein the equalizer receives input from one communications channel.

43. The computer-readable medium of claim 39, wherein the equalizer receives input from each of a plurality of communications channels, and wherein generating the noise power, generating the signal power, and determining the signal to noise ratio are performed for two or more communications channels of the plurality of communications channels.

44. The computer-readable medium of claim 43, wherein:
- the plurality of communications channels are based on a frequency hopping protocol; and
- the equalizer is associated with a device that is selected from the group consisting of a wireless device and a mobile device.

45. The computer-readable medium of claim 39, wherein the equalizer is selected from the group consisting of a linear equalizer, a transversal filter, a nonlinear equalizer, and a decision feedback equalizer.

46. The computer-readable medium of claim 39, wherein the equalizer operates in a decision directed mode.

47. The computer-readable medium of claim 39, wherein the communications channel is the first communications channel, the signal to noise ratio is a first signal to noise ratio, and the computer-readable medium further comprises one or more sequences of instructions which, when executed by the one or more processors, causes the one or more processors to perform the steps of:
- based on the first signal to noise ratio, determining the third power for transmitting communications over the first communications channel; based on an additional error output of the equalizer that receives input from a second communications channel, generating an additional noise power; based on an additional signal output of the equalizer that receives input from the second communications channel, generating an additional signal power; based on the additional noise power and the additional signal power, determining a second signal to noise ratio; and based on the second signal to noise ratio, determining a fifth power for transmitting communications over the second communications channel.

48. The computer-readable medium of claim 38, further comprising one or more sequences of instructions which, when executed by the one or more processors, causes the one or more processors to perform the step of:

based on additional performance data, modifying at least one of the third power and the fourth power.

49. The computer-readable medium of claim 38, wherein:

the first communications channel and the second communications channel communicatively couple a first participant and a second participant;

the first participant is selected from the group consisting of a master participant, a first wireless device, and a first mobile device; and the second participant is selected from the group consisting of a slave participant, a second wireless device, and a second mobile device.

50. The computer-readable medium of claim 38, wherein:

the first communications channel and the second communications channel communicatively couple a first participant and a second participant; and the first participant and the second participant are associated with a communications arrangement that uses a protocol that is selected from the group consisting of a first frequency hopping protocol and a second frequency hopping protocol that is defined by Institute of Electrical and Electronics Engineers 802.15.1 Wireless Personal Area Network Standard.

51. The computer-readable medium of claim 38, wherein the instructions for determining the third power include one or more sequences of instructions which, when executed by the one or more processors, causes the one or more processors to perform the steps of:

determining the third power based on performance data for the first communications channel and one or more attributes of a participant, wherein the one or more attributes of the participant include an identifier that distinguishes the participant from one or more other participants.

52. The computer-readable medium of claim 38, wherein:

a first participant and a second participant are communicatively coupled by both the first communications channel and the second communications channel;

the instructions for determining the third power include one or more sequences of instructions which, when executed by the one or more processors, causes the one or more processors to perform the step of determining the third power based on performance data that is based on communications between the first participant and the second participant over the first communications channel; and the instructions for determining the fourth power include one or more sequences of instructions which, when executed by the one or more processors, causes the one or more processors to perform the step of determining the fourth power based on performance data that is based on communications between the first participant and the second participant over the second communications channel.

53. The computer-readable medium of claim 52, wherein the first participant and a third participant are communicatively coupled by the first communications channel, and wherein the computer-readable medium further comprises one or more sequences of instructions which, when executed by the one or more processors, causes the one or more processors to perform the step of:

based on performance data that is based on communications between the first participant and the third participant over the first communications channel, determining a fifth power for communications that use the first communications channel and that are between the first participant and the third participant.

54. The computer-readable medium of claim 38, wherein:

a first participant and a second participant are communicatively coupled by the first communications channel;

the instructions for determining the third power include one or more sequences of instructions which, when executed by the one or more processors, causes the one or more processors to perform the step of:

determining the third power based on performance data that is based on communications from the first participant to the second participant over the first communications channel, wherein the third power is used for subsequent communications from the first participant to the second participant over the first communications channel; and the computer-readable medium further comprises one or more sequences of instructions which, when executed by the one or more processors, causes the one or more processors to perform the step of:

determining a fifth power based on performance data that is based on communications from the second participant to the first participant over the first communications channel, wherein the fifth power is used for communications from the second participant to the first participant over the first communications channel, and wherein the fifth power is different from the third power.

55. The computer-readable medium of claim 38, wherein the instructions for generating the performance data include one or more sequences of instructions which, when executed by the one or more processors, causes the one or more processors to perform the steps of:

generating an estimated signal to noise ratio based one or more communications between a first participant and a second participant over the first communications channel; and generating the performance data for the first communications channel, based on the estimated signal to noise ratio and a specified signal to noise ratio.

56. The computer-readable medium of claim 55, wherein the instructions for generating the estimated signal to noise ratio include one or more sequences of instructions which, when executed by the one or more processors, causes the one or more processors to perform the steps of:

generating a noise power, based on an error output of an equalizer that receives input from the first communications channel;

generating a signal power, based on a signal output of the equalizer; and determining the estimated signal to noise ratio, based on the noise power and the signal power.

57. The computer-readable medium of claim 38, further comprising one or more sequences of instructions which, when executed by the one or more processors, causes the one or more processors to perform the step of:

determining a power request value based on a measured performance value and a specified performance value.

58. The computer-readable medium of claim 38, further comprising one or more sequences of instructions which, when executed by the one or more processors, causes the one or more processors to perform the steps of:

generating performance data for the first communications channel based on one or more communications between a first participant and a second participant;

causing the performance data to be transferred from the second participant to the first participant; and wherein the one or more communications are from the first participant to the second participant, and the second participant generates the performance data based on the one or more communications.

59. The computer-readable medium of claim 58, further comprising one or more sequences of instructions which, when executed by the one or more processors, causes the one or more processors to perform the step of:

causing additional performance data to be transferred from the first participant to the second participant, wherein the additional performance data is based on one or more additional communications from the second participant to the first participant.

60. The computer-readable medium of claim 58, wherein the instructions for causing the performance data to be transferred include one or more sequences of instructions which, when executed by the one or more processors, causes the one or more processors to perform the steps of:

generating a packet that includes the performance data, wherein the packet includes at least one signed word of a specified length to represent a magnitude and direction of power change; and transferring the packet from the second participant to the first participant.

61. The computer-readable medium of claim 38, wherein the instructions for determining the third power include one or more sequences of instructions which, when executed by the one or more processors, causes the one or more processors to perform the steps of:

determining an initial power based on the performance data;

determining whether the initial power satisfies one or more criteria;

when the initial power satisfies the one or more criteria, using the initial power as the third power;

when the initial power fails to satisfy the one or more criteria:

generating a modified power; and using the modified power as the third power.

62. The computer-readable medium of claim 61, wherein the one or more criteria include a minimum power, wherein the initial power is less than the minimum power, and the computer-readable medium further comprises one or more sequences of instructions which, when executed by the one or more processors, causes the one or more processors to perform the steps of:

generating the modified power based on the minimum power; and using the modified power as the third power.

63. The computer-readable medium of claim 61, wherein the one or more criteria include a maximum power, wherein the initial power is greater than the maximum power, and the computer-readable medium further comprises one or more sequences of instructions which, when executed by the one or more processors, causes the one or more processors to perform the steps of:

generating the modified power based on the maximum power; and using the modified power as the third power.

64. The computer-readable medium of claim 63, wherein performance of the first communications channel using the third power fails to satisfy one or more channel performance criteria, and the computer-readable medium further comprises one or more sequences of instructions which, when executed by the one or more processors, causes the one or more processors to perform the step of:

reducing the third power to less than the maximum power.

65. The computer-readable medium of claim 64, wherein the instructions for reducing the third power include one or more sequences of instructions which, when executed by the one or more processors, causes the one or more processors to perform the step of:

reducing the third power to a particular power that is selected from the group consisting of a fifth power that is less than a minimum power and a sixth power that is about zero power.

* * * * *